US012487235B2

(12) United States Patent
Chan et al.

(10) Patent No.: US 12,487,235 B2
(45) Date of Patent: Dec. 2, 2025

(54) COMPOSITIONS AND METHODS FOR STUDYING DRUG METABOLISM

(71) Applicant: Boehringer Ingelheim International GmbH, Ingelheim am Rhein (DE)

(72) Inventors: Tom Sze-Yin Chan, Danbury, CT (US); Alexander Matthew Horspool, Morgantown, WV (US); Ting Wang, Danbury, CT (US)

(73) Assignee: Boehringer Ingelheim International GmbH, Ingelheim am Rhein (DE)

( * ) Notice: Subject to any disclaimer, the term of this patent is extended or adjusted under 35 U.S.C. 154(b) by 793 days.

(21) Appl. No.: 17/148,748

(22) Filed: Jan. 14, 2021

(65) Prior Publication Data

US 2021/0223237 A1    Jul. 22, 2021

Related U.S. Application Data

(60) Provisional application No. 62/962,333, filed on Jan. 17, 2020.

(51) Int. Cl.
*G01N 33/543* (2006.01)
*G01N 33/50* (2006.01)
*G01N 33/58* (2006.01)

(52) U.S. Cl.
CPC ... *G01N 33/54326* (2013.01); *G01N 33/5008* (2013.01); *G01N 33/585* (2013.01)

(58) Field of Classification Search
None
See application file for complete search history.

(56) References Cited

PUBLICATIONS

Kulsharova et al. ("Mimicking human drug metabolic reactions using microfludic platforms" (2018 Thesis)) (Year: 2018).*
Rowland et al. ("Binding of Inhibitory Fatty Acids Is Responsible for the Enhancement of UDP-Glucuronosyltransferase 2B7 Activity by Albumin: Implications for in Vitro-in Vivo Extrapolation") Journal of Pharmacology and Experimental Therapeutics 321 (1) 137-147 (2007)). (Year: 2007).*
Seenuvasan et al Magnetic nanoparticles a versatile carrier for enzymes in bioprocessing sectors IET Nanobiotechnol 12 5 535 548 2018 (Year: 2018).*
Screening reactive metabolites bioactivated by multiple enzyme pathways using a multiplexed microfluidic system, Analyst 138(1), 171-178 (2013) (Year: 2013).*
Abas et al., "Maximum yields of microsomal-type membranes from small amounts of plant material without requiring ultracentrifugation", Analytical Biochemistry, 2010, vol. 401, No. 2, pp. 217-227.
Achour et al., "Global Proteomic Analysis of Human Liver Microsomes: Rapid Characterization and Quantification of Hepatic Drug-Metabolizing Enzymes", Drug Metabolism and Disposition, 2017, vol. 45, No. 6, pp. 666-675.
Adelman et al., "Ribosome-Membrane Interaction", the Journal of Cell Biology, 1973, vol. 56, No. 1, pp. 206-229.
Algeelani et al., "Inhibitory effects of sulfonylureas and non?steroidal anti?inflammatory drugs on in vitro metabolism of canagliflozin in human liver microsomes", Biopharmaceutics & Drug Disposition, 2018, vol. 39, No. 3, pp. 135-142.
Ballard et al., "Generation of Major Human Excretory and Circulating Drug Metabolites Using a Hepatocyte Relay Method", Drug Metabolism and Disposition, 2014, vol. 42, No. 5, pp. 899-902.
Boase et al., "In vitro-in vivo correlations for drugs eliminated by glucuronidation: Investigations with the model substrate zidovudine", British Journal of Clinical Pharmacology, 2002, vol. 54, No. 5, pp. 493-503.
Chalmers et al., "Quantification of non?specific binding of magnetic micro? and nanoparticles using cell tracking velocimetry: Implication for magnetic cell separation and detection", Biotechnology and Bioengineering, 2009, vol. 105, No. 6, pp. 1078-1093.
Claude, "Fractionation of Mammalian Liver Cells by Differential Centrifugation", The Journal of Experimental Medicine, 1946, vol. 84, No. 1, pp. 61-89.
Di et al., "Addressing the Challenges of Low Clearance in Drug Research", The AAPS Journal, 2015, vol. 17, No. 2. pp. 352-357.
Foddai et al., "Maximizing Capture Efficiency and Specificity of Magnetic Separation for *Mycobacterium avium* subsp. baratuberculosis Cells", Applied and Environmental Microbiology, 2010, vol. 76, No. 22, pp. 7550-7558.
Foti et al., "Impact of Incubation Conditions on Bufuralol Human Clearance Predictions: Enzyme Lability and Nonspecific Binding", Drug Metabolism and Disposition, 2004, vol. 32, No. 3, pp. 295-304.
Fukuzaki et al., "Adsorption of bovine serum albumin onto metal oxide surfaces", Journal of Fermentation and Bioengineering, 1996, vol. 81, No. 2, pp. 163-167.
Ghuman et al., "Structural Basis of the Drug-binding Specificity of Human Serum Albumin", Journal of Molecular Biology, 2005, vol. 353, No. 1, pp. 38-52.
Gill et al., "Characterization of In Vitro Glucuronidation Clearance of a Range of Drugs in Human Kidney Microsomes: Comparison with Liver and Intestinal Glucuronidation and Impact of Albumin", Drug Metabolism and Disposition, 2012, vol. 40, No. 4, pp. 825-835.
Griffin et al., "Prediction of In Vitro Intrinsic Clearance From Hepatocytes: Comparison of Suspensions and Monolayer Cultures", Drug Metabolism and Disposition, 2005, vol. 33, No. 1, pp. 115-120.
Haukanes et al., "Application of Magnetic Beads in Bioassays", Biotechnology, 1993, vol. 11, No. 1, pp. 60-63.
Hiraoka et al., "Kidneys contribute to the extrahepatic clearance of propofol in humans, but not lungs and brain", British Journal of Clinical Pharmacology, 2005, vol. 60, No. 2, pp. 176-182.
Houston, "Utility of in vitro drug metabolism data in predicting in vivo metabolic clearance", Biochemical Pharmacology, 1994, vol. 47, No. 9, pp. 1469-1479.

(Continued)

*Primary Examiner* — Christopher L Chin
(74) *Attorney, Agent, or Firm* — Mary Breen Smith

(57) ABSTRACT

The present invention relates to microsomes bound to magnetizable beads and their use in studying or determining drug metabolism. Compositions, methods, kits and systems involving the magnetizable bead-bound microsomes are described herein.

3 Claims, 11 Drawing Sheets

(56) References Cited

PUBLICATIONS

Howe et al., "Extrahepatic metabolism of zidovudine", British Journal of Clinical Pharmacology, 1992, vol. 33, No. 2, pp. 190-192.

Ito et al., "Prediction of Human Drug Clearance from in Vitro and Preclinical Data Using Physiologically Based and Empirical Approaches", Pharmaceutical Research, 2005, vol. 22, No. 1, pp. 103-112.

Ito et al., "Quantitative Prediction of In Vivo Drug Clearance and Drug Interactions From in Vitro Data on Metabolism, Together With Binding and Transport", Pharmacology and Toxicology, 2005, vol. 38, No. 1, pp. 461-499.

Iwatsubo et al., "Prediction of in vivo drug metabolism in the human liver from in vitro metabolism data", Pharmacology & Therapeutics, 1997, vol. 73, No. 2, pp. 147-171.

Kandel et al., "Role of Protein-Protein Interactions in Cytochrome P450-Mediated Drug Metabolism and Toxicity", Chemical Research in Toxicology, 2014, vol. 27, No. 9, pp. 1474-1486.

Kettiger et al., "Interactions between silica nanoparticles and phospholipid membranes", Biochimica et Biophysica Acta (BBA)—Biomembranes, 2016, vol. 1858, No. 9, pp. 2163-2170.

Kilford et al., "Prediction of Drug Clearance by Glucuronidation from in Vitro Data: Use of Combined Cytochrome P450 and UDP-Glucuronosyltransferase Cofactors in Alamethicin-Activated Human Liver Microsomes", Drug Metabolism and Disposition, 2009, vol. 37, No. 1, pp. 82-89.

Manevski et al., "Bovine Serum Albumin Decreases Km Values of Human UDP-Glucuronosyltransferases 1A9 and 2B7 and Increases Vmax Values of UGT1A9", Drug Metabolism and Disposition, 2011, vol. 39, No. 11, pp. 2117-2129.

Masimirembwa et al., "Metabolic Stability for Drug Discovery and Development", Clinical Pharmacokinetics, 2003, vol. 42, No. 6, pp. 515-528.

McLure et al., "Nonspecific binding of drugs to human liver microsomes", British Journal of Clinical Pharmacology, 2000, vol. 49, No. 5, pp. 453-461.

Meissner et al., "Characterization of protein adsorption onto silica nanoparticles: influence of pH and ionic strength", Colloid and Polymer Science, 2015, vol. 293, No. 11, pp. 3381-3391.

Miners et al., "Predicting Human Drug Glucuronidation Parameters: Application of In Vitro and In Silico Modeling Approaches", Annual Review of Pharmacology and Toxicology, 2004, vol. 44, No. 1, pp. 1-25.

Nelson et al., "Variables in Human Liver Microsome Preparation: Impact On the Kinetics of L -?-Acetylmethadol (LAAM) N-Demethylation and Dextromethorphan O-Demethylation", Drug Metabolism and Disposition, vol. vol. 29, No. No 3, pp. 319-325.

Ohlsson et al., "Fractionation of microsomal membranes on the basis of their surface properties", Biochemical Journal, 1978, vol. 172, No. 1, pp. 189-192.

Omura et al., "The Carbon Monoxide-binding Pigment of Liver Microsomes I. Evidence for Its Hemoprotein Nature", Journal of Biological Chemistry, 1964, vol. 239, No. 7, pp. 2370-2378.

Omura et al., "The Carbon Monoxide-binding Pigment of Liver Microsomes II. Solubilization, Purification, and Properties", Journal of Biological Chemistry, 1964, vol. 239, No. 7, pp. 2379-2385.

Orrenius et al., "Phenobarbital-Induced Synthesis of the Microsomal Drug-Metabolizing Enzyme System and Its Relationship to the Proliferation of Endoplasmic Membranes", The Journal of Cell Biology, 1965, vol. 25, No. 3, pp. 627-639.

Palacharla et al., "Inhibition of cytochrome P450 enzymes by saturated and unsaturated fatty acids in human liver microsomes, characterization of enzyme kinetics in the presence of bovine serum albumin (0.1 and 1.0% w/v) and in vitro-in vivo extrapolation of hepatic clearance", European Journal of Pharmaceutical Sciences, 2017, vol. 101, pp. 80-89.

Proctor et al., "Predicting drug clearance from recombinantly expressed CYPs: intersystem extrapolation factors", Xenobiotica, 2004, vol. 34, No. 2, pp. 151-178.

Roberts, "Drug metabolism and pharmacokinetics in drug discovery.", Current Opinion in Drug Discovery & Development, 2003, vol. 6, No. 1, pp. 66-80.

Rowland et al., "Binding of Inhibitory Fatty Acids Is Responsible for the Enhancement of UDP—Glucuronosyltransferase 2B7 Activity by Albumin: Implications for in Vitro-in Vivo Extrapolation", Journal of Pharmacology and Experimental Therapeutics, 2007, vol. 321, No. 1, pp. 137-147.

Rowland et al., "In Vitro Characterization of Lamotrigine N2-Glucuronidation and the Lamotrigine-Valproic Acid Interaction", Drug Metabolism and Disposition, 2006, vol. 34, No. 6, pp. 1055-1062.

Rowland et al., "The "Albumin Effect" and Drug Glucuronidation: Bovine Serum Albumin and Fatty Acid-Free Human Serum Albumin Enhance the Glucuronidation of UDP-Glucuronosyltransferase (UGT) 1A9 Substrates but Not UGT1A1 and UGT1A6 Activities", Drug Metabolism and Disposition, 2008, vol. 36, No. 6, pp. 1056-1062.

Schneemilch et al., "Free energy of adhesion of lipid bilayers on silica surfaces", The Journal of Chemical Physics, 2018, vol. 148, No. 19, pp. 194704.

Shi et al., "DNA Binding to the Silica Surface", The Journal of Physical Chemistry B, 2015, vol. 119, No. 34, pp. 11030-11040.

Strittmatter et al., "A Hemochromogen Component of Liver Microsomes*", Proceedings of the National Academy of Sciences, 1952, vol. 38, No. 1, pp. 19-25.

Takizawa et al., "Human Kidneys Play an Important Role in the Elimination of Propofol", Anesthesiology, 2005, vol. 102, pp. 327-330.

Tang et al., "Effect of Albumin on Phenytoin and Tolbutamide Metabolism in Human Liver Microsomes: An Impact More Than Protein Binding", Drug Metabolism and Disposition, 2002, vol. 30, No. 6, pp. 648-654.

Uchaipichat et al., "Quantitative prediction of in vivo inhibitory interactions involving glucuronidated drugs from in vitro data: the effect of fluconazole on zidovudine glucuronidation", British Journal of Clinical Pharmacology, 2006, vol. 61, No. 4, pp. 427-439.

Vusse, "Albumin as Fatty Acid Transporter", 2008, pp. 4-4.

Walker et al., "Biosynthesis of Drug Metabolites and Quantitation Using NMR Spectroscopy for Use in Pharmacologic and Drug Metabolism Studies", Drug Metabolism and Disposition, 2014, vol. 42, No. 10, pp. 1627-1639.

Walsky et al., "Optimized Assays for Human UDP-Glucuronosyltransferase (UGT) Activities: Altered Alamethicin Concentration and Utility to Screen for UGT Inhibitors", Drug Metabolism and Disposition, 2012, vol. 40, No. 5, pp. 1051-1065.

Ward, "Recent advances in pharmacokinetic extrapolation from preclinical data to humans", Expert Opinion on Drug Metabolism & Toxicology, 2005, vol. 1, No. 4, pp. 583-594.

Corning Incorporated Life Sciences "Corning Supersomes Human UDP-glucuronsytransferases Portfolio" accessed Jul. 24, 2023, www.corning.com/lifesciences, 2 pgs.

Kampe, Thomas et al. "Modular Microfluidic System for Emulation of Human Phase I/Phase II Metabolism" (2014) Analytical Chemistry, 3068-3074.

* cited by examiner

Panel A

Panel B

Panel A

Panel B

Panel C

Panel A

Panel B

Panel A

Panel B

Panel C

COMPOSITIONS AND METHODS FOR STUDYING DRUG METABOLISM

FIELD OF THE INVENTION

The present disclosure generally relates to microsomes bound to magnetizable beads and their use to study or determine drug metabolism.

BACKGROUND OF THE INVENTION

In drug development, prediction of in vivo drug clearance and in vivo drug-drug interaction (DDI) risk using in vitro metabolism models facilitate the design of safe clinical studies. Microsomal fractions isolated from metabolically active organs (e.g. liver and kidney) are commonly used as an in vitro tool to study the activity of important drug metabolizing enzymes such as cytochrome P450s (CYP450) and uridine-diphosphate-glucuronosyltransferases (UGT). The rapid growth in the number of commercially available microsomal products has resulted in lower costs, increased quality and wide adoption by academia and industry as a gold-standard tool to study drug metabolism. A microsomal incubation involves the addition of a concentrated preparation of microsomes to a suitable buffer, followed by the addition of test substance and a cofactor (if required) to initiate an enzymatic reaction. The rate of depletion of the test substance and/or metabolite formation from the enzymatic reaction(s) can be determined using samples collected during the incubation. These typical incubations, however, are limited by the short functional duration of several key microsomal enzymes (i.e. oxidative enzymes) which limits the incubation time available to observe metabolism. This can be particularly problematic for compounds that are metabolized very slowly. Although enzymatic reactions can be optimized by the addition of other reagents that enhance substrate accessibility to the active site (e.g., alamethicin) or act to remove inhibitory contaminants (e.g. albumin-mediated removal of free fatty acids), care must be taken to ensure the additives themselves are not affecting the availability of test compound to the active sites of enzymes or affect the activity of enzymes under study. Furthermore the correct interpretation of data derived from experiments using microsomes often requires additional experiments to determine the effects of non-specific binding of the test compounds to the microsomes. Therefore, there exists a need for improved methods and compositions for studying or determining drug metabolism using microsomes.

SUMMARY OF THE INVENTION

To address the above-mentioned deficiencies with the current methods, one way of maintaining functional enzyme activity during incubations is to replace functionally expired microsomes with new microsomes. In practice, however, the replacing of microsomes is very challenging as it requires a long centrifugation step, at cooled temperatures and ultra-high rotational speeds. Ideally, a method to rapidly remove microsomes from an incubation without centrifugation could not only enable rapid sequential microsomal exchanges, but also facilitate decontamination of microsomes from components present in storage or incubation media or provide a means to assess non-specific binding of test compounds to the microsomes. Without wishing to be bound by any theories, the present invention is, in part, based on a surprising discovery that binding of the microsomes to magnetizable beads not only renders them easier to manipulate, replace or remove, but also improves the quality of the drug metabolism data obtained in comparison to conventional suspended microsomes.

In an aspect, the present invention relates to microsomes prepared from human or animal organs, insects or isolated cells which are bound to magnetizable beads.

In another aspect, the present invention relates to an aqueous composition including microsomes, prepared from human or animal organs, insects or isolated cells, which are bound to magnetizable beads.

In a further aspect, the present invention relates to a method for studying or determining drug metabolism, said method including providing a composition comprising microsomes prepared from human or animal organs, insects, or isolated cells, which are bound to magnetizable beads, adding to the composition a drug and any cofactors or additives required for a metabolic reaction; and at least one of measuring and identifying the drug or a metabolite of the drug.

In yet another aspect, the present invention relates to a kit, said kit including microsomes prepared from human or animal organs, insects, or isolated cells, magnetizable beads, and instructions for binding the microsomes to the magnetizable beads.

In an aspect, the present invention relates to a kit for studying or determining drug metabolism, said kit including an aqueous composition including microsomes bound to magnetizable beads and an instruction for conducting a drug metabolism study or assay.

In another aspect, the present invention relates to a kit for studying or determining non-specific binding of drugs to microsomes bound to magnetizable beads, said kit including an aqueous composition including microsomes bound to magnetizable beads and an instruction for conducting the binding study or assay.

In yet another aspect, the present invention relates to a method to measure the metabolism of a compound from in vitro data includes adding a plurality of magnetizable beads to a container; adding a plurality of microsomes to the container to make a composition comprising a plurality of microsomes bound to magnetizable beads (microsome-beads) by binding at least a number of the plurality of microsomes to the plurality of magnetizable beads; applying a magnetic field to the composition; removing the surrounding solution from the microsome-beads; determining a protein content of the microsome-beads either indirectly by determining the content of microsomes in the solution around the microsome-beads or directly on the magnetizable beads; conducting zero up to an unlimited number of washing steps using a magnetic field to repeatedly conduct cycles of separating the microsome-beads from a suitable washing liquid and resuspending the microsome-beads in a suitable washing liquid; resuspending the microsome-beads in a suitable incubation solution held at a suitable temperature, with continuous mixing; adding the compound of interest and any necessary reagents required to initiate one or more enzymatic reactions; extracting aliquots of the incubation mixture and analyzing mixture to determine the amount remaining of the compound of interest or the identity and/or quantity of metabolites formed at various times after the initiation of the enzymatic reactions; where suitable parameters can be obtained from the in vitro data, the intrinsic clearance ($CL_{int}$) of the compound of interest in the organ from which the microsomes were derived can be calculated after applying appropriate in vitro to in vivo scaling factors such as the size of the organ from which the microsomes were derived and any potential in vitro factors that could affect the accuracy of the prediction such as the amount of compound bound to the microsome-beads or to the incubation container. Organ clearance can be further calculated by considering the rate of blood flow through the organ.

In an aspect, the present invention relates to a method for normalizing metabolic activity from in vitro data includes determining the content of microsomes bound to a plurality of microsome-beads. In this aspect, a composition of microsome-beads is created by mixing together magnetizable beads, microsomes, and a suitable wash solution or incubation solution, wherein at least a number of the microsomes bind to the magnetizable beads to create microsome-beads; applying a magnetic field to separate the microsome-beads from the surrounding liquid (supernatant), and removing the microsome-beads from the supernatant by a magnetic or removing the supernatant from the microsome-beads while applying the magnetic field; measuring the content of microsomes remaining in the supernatant and relating the difference in the amount of microsomes in the initial composition of microsome-beads and the remaining amount of microsomes in the supernatant to the amount of microsomes on the plurality of magnetizable beads. Microsomal content can be determined by various techniques such as quantifying general protein content, phospholipid content, protein content of a specific or multiple specific microsomal proteins or measuring the activity of a reaction that is anticipated to be representative of the content of microsomes in the supernatant. The quantity of microsomes is then used to normalize metabolic data to the quantity of microsomes on microsome-beads in a metabolic incubation.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

Figure 1:
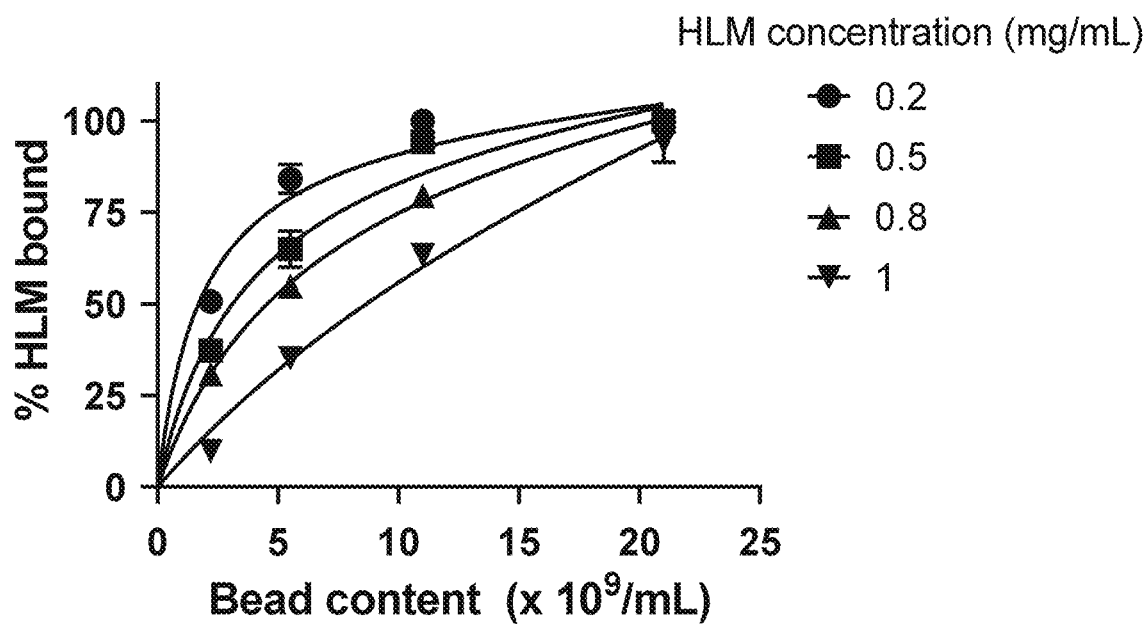
FIG. 1 illustrates the relationship between the number of beads and the percentage of HLM bound at various concentrations of human liver microsomes (HLM), according to an example of the present disclosure.

It is to be understood that both the foregoing general description and the following detailed description are exemplary and explanatory only, and are intended to provide an explanation of various embodiments of the present teachings.

Definitions

As used herein, the term "magnetizable bead" refers to one or more beads that contains ferromagnetic material such as iron, nickel, cobalt, gadolinium, neodymium and/or samarium in a quantity sufficient to allow the bead to be magnetically attracted to a magnet and who's surface is composed of material that binds to microsomes (e.g. polystyrene or silica). A magentizable bead may also be referred to as a magnetic bead.

As used herein, the term "microsome-bead" refers to one or more microsomes prepared from human or animal organs, insects or isolated cells, which are bound to one or more magnetizable beads with a bead surface material composed of dextran, polystyrene or silica. Microsomes are isolated endoplasmic reticulum from cells of various organs such as the liver, kidney or small intestine of animals. Microsomes can also be prepared from isolated cells or cell cultures. Well-known examples of human-derived microsomes used to study drug metabolism are human liver microsomes (HLM), human kidney microsomes (HKM), human lung microsomes and human intestinal microsomes (HIM). As used herein, the term "HLM-beads" refers to microsomes-beads derived from human liver.

In drug development, prediction of in vivo drug clearance and in vivo drug-drug interaction (DDI) risk using in vitro metabolism assays facilitate the design of safe and informative clinical studies. Metabolic drug clearance is usually mediated by enzymes in the liver, but can occur in via enzymes expressed in the other organs of the body. Several major drug metabolizing enzymes are highly expressed on the endoplasmic reticulum of cells. DDIs can occur when the activity of one or more of these enzymes is affected by another drug (comedicants) or xenobiotic such as an environmental contaminant. Isolated endoplasmic reticulum (microsomes) from cells of various organs such as the liver, kidney or small intestine are commonly used as an in vitro tool to study or determine the activity of important drug metabolizing enzymes expressed on the endoplasmic reticulum such as cytochrome P450s (CYP450) and uridine-diphosphate-glucuronosyltransferases (UGT).

Typical in vitro microsomal incubations involve the addition of an HLM stock solution to a suitable buffer followed by the addition of test substance and a cofactor (if required) to initiate one or more enzymatic reaction(s). The rate of depletion of the test substance, and/or metabolite formation from the enzymatic reaction(s), can be determined using samples collected during the incubation. Key considerations in these studies include the use of optimal HLM protein concentrations to maximize enzyme activity and minimize non-specific binding, and carefully controlling the duration of incubation to avoid confounding effects of auto-inactivation of sensitive enzyme activities. Furthermore, additional reagents can be used to optimize enzyme activity by enhancing substrate accessibility to the active site (e.g. the permeabilizing agent alemethicin) or to remove inhibitory contaminants, such as the use of albumin to sequester and remove inhibitory fatty acids. Further processing of HLM suspensions to remove reagents and contaminants requires time-demanding ultracentrifugation procedures. A more rapid method of separating HLM from the incubation solutions would be considered a substantial advance, as this will facilitate improved utilization of microsomes, including but not limited to longer incubations with test substances.

Subcellular fractions such as endoplasmic reticulum, mitochondria, or nuclei are composed of phospholipids and proteins that have been found to be associated with metalloids such as silica. Binding of these subcellular fractions to metalloids has been attributed to strong ionic interactions between positively charged peptides and the negatively charged silanol groups of silica. Strong binding of cellular components to silica has successfully been used for purification purposes; for example, magnetizable bead-based separation has been extensively used to purify mRNA to facilitate downstream gene expression procedures. Furthermore, larger materials such as proteins or entire cells can be isolated with magnetizable beads when used in conjunction with bead-bound antibodies. Our work investigates the feasibility of binding metabolically active microsomes to magnetizable beads, facilitated by attraction of the phospholipids of the microsomes to the silica-coated surface of the magnetizable beads.

As provided in the background section, multiple factors exist that if not controlled for, can negatively affect the activity of the enzymes being studied. The present invention augments the activity of at least one class of important drug metabolizing enzymes. Without wishing to be bound by any theories, the present invention is, in part, based on a surprising discovery that binding of the microsomes to magnetizable beads not only renders them easier to manipulate, remove or replace, but also improves the quality of the drug metabolism data obtained in comparison to unbound microsomes. The various aspects of the present invention will be described in more detail below.

In one aspect, the present invention relates to microsomes bound to a plurality of magnetizable beads. In an embodiment relating to this aspect, the plurality of the magnetizable beads is mixed with the microsomes under suitable conditions to create microsome-beads. In an embodiment relating to this aspect, the plurality of magnetizable beads is at least one of silica-coated beads, dextran-coated beads, or polystyrene-coated beads or a combination thereof. Furthermore the magnetizable beads contain a sufficient quantity of ferromagnetic material such as iron, nickel, cobalt, gadolinium, neodymium and or samarium. In another embodiment relating to this aspect, the magnetizable beads comprise at least one of silica coating, dextran coating, or polystyrene coating or a combination thereof. In another embodiment, the invention relates to microsomes bound to a plurality of magnetizable beads, wherein the plurality of the magnetizable beads is mixed with the microsomes under suitable conditions to create microsome-beads, and wherein the plurality of magnetizable beads is at least one of silica-coated beads, dextran-coated beads, or polystyrene-coated beads or a combination thereof.

In another aspect, the present invention relates to an aqueous composition comprising microsomes bound to magnetizable beads. In an embodiment relating to this aspect, the microsomes are isolated endoplasmic reticulum from animal tissue (e.g., human liver microsomes) or cultured cells (e.g. Sf9 insect-derived expression platform). In an embodiment relating to this aspect, the plurality of magnetizable beads is at least one of silica-coated beads, dextran-coated beads, or polystyrene-coated beads or a combination thereof. In another embodiment relating to this aspect, the magnetizable beads comprise at least one of silica coating, dextran coating, or polystyrene coating or a combination thereof. In another embodiment relating to this aspect, the aqueous composition is for a drug metabolism study or assay. In another embodiment relating to this aspect, the aqueous composition further comprises a buffer and has a pH of about 4.0 to about 9.0. In another embodiment, the present invention relates to an aqueous composition comprising microsome-beads; wherein the microsomes are HLM; wherein the magnetizable beads comprise at least one of silica coating, dextran coating, or polystyrene coating or a combination thereof; wherein the aqueous composition is for a drug metabolism study or assay; and wherein the aqueous composition further comprises a buffer and has a pH of about 4.0 to about 9.0; and wherein the temperature of the aqueous composition is maintained at between 2 to 60° C.

In another aspect, the present invention relates to a method of studying or determining drug metabolism, said method including: a composition comprising microsome-beads, adding to the composition a drug and any cofactors or additives required for a metabolic reaction; and measuring or identifying the drug or metabolite of the drug. In an embodiment relating to this aspect, the method further comprises applying a magnetic field to the composition in order to apply washing steps to the composition and or removing the composition from the incubation. In another embodiment relating to this aspect, the method comprises measuring or identifying a metabolite of the drug. In another related embodiment, the measurement of the rate of the metabolism of the drug either by measuring its disappearance or formation of its metabolites is normalized to the measured content of microsomal protein attached to the magnetizable beads. For example, if a 1 mL incubation of microsome-beads contains 1 mg/mL of microsomal protein, the rate of metabolism is expressed as a value per mg of microsomal protein. In another embodiment relating to this aspect, the magnetizable beads comprise at least one of silica coating, dextran coating, or polystyrene coating or a combination thereof.

In another aspect, the present invention relates to a kit for studying or determining drug metabolism. In an embodiment relating to this aspect, the kit comprises an aqueous composition comprising microsome-beads and an instruction for conducting a drug metabolism study or assay. In another relating embodiment, the instruction comprises applying a magnetic field to the aqueous composition to separate the microsome-beads from any microsomes in a supernatant. In another embodiment relating to this aspect, the magnetizable beads of the microsome-beads comprise at least one of silica coating, dextran coating, or polystyrene coating or a combination thereof. In another related embodiment, the instruction comprise determining a protein content of the microsome-beads in the aqueous composition.

In another aspect, the present invention relates to a kit for studying or determining drug metabolism. In an embodiment relating to this aspect, the kit comprises a plurality of microsomes, a plurality of magnetizable beads and an instruction for creating microsome-beads and for conducting a drug metabolism study or assay. In another relating embodiment, the instruction comprises applying a magnetic field to the aqueous composition to separate the microsome-beads from any microsomes in a supernatant. In another embodiment relating to this aspect, the magnetizable beads of the microsome-beads comprise at least one of silica coating, dextran coating, or polystyrene coating or a combination thereof. In another related embodiment, the instruction comprise determining a protein content of the microsome-beads in the aqueous composition.

In another aspect, the present invention relates to a kit for studying or determining non-specific binding of drugs to microsome-beads, wherein the kit comprises an instruction for conducting the binding study or assay. In an embodiment relating to this aspect, the instruction for conducting the binding study or assay comprises applying a magnetic field to the microsome-beads in a suitable buffer as described herein.

In another aspect, the present invention relates to an in-vitro system for use in measuring drug metabolism, said method comprising a container (e.g., a test tube, microcentrifuge tube, multi-well plate) containing a plurality of magnetizable beads and a plurality of microsomes and a mixer that mixes the plurality of microsomes and the plurality of magnetizable beads in the container to create a mixture that includes at least a plurality of microsome-beads, wherein the plurality of microsome-beads is created by binding a number of the plurality of microsomes to the plurality of magnetizable beads.

In an aspect, the present invention relates to a method for normalizing metabolic activity from in vitro data includes determining the content of microsomes on a plurality of microsome-beads. In this aspect, a composition of microsome-beads is created by mixing together magnetizable beads, microsomes, and a suitable wash solution or incubation solution, wherein at least a number of the microsomes bind to magnetizable beads to create a plurality of microsome-beads; applying a magnetic field to separate the microsome-beads from the surrounding liquid (supernatant), and removing the microsome-beads from the supernatant by a magnet or removing the supernatant from the microsome-beads while applying the magnetic field; measuring the content of microsomes remaining in the supernatant and relating the difference in the amount of microsomes in the initial composition of microsome-beads and the remaining amount of microsomes in the supernatant to the amount of microsomes on the plurality of magnetizable beads. Microsomal content can be determined by various techniques such as quantifying general protein content, phospholipid content, protein content of a specific or multiple specific microsomal proteins or measuring the activity of a reaction that is anticipated to be representative of the content of microsomes in the supernatant or on the magnetizable beads. The quantity of microsomes is then used to normalize metabolic data to the quantity of microsomes on microsome-beads in a metabolic incubation.

In another aspect, the present invention relates to a system and/or a kit to remove cofounding agents that could be detrimental to the enzyme reaction(s), such as free fatty acids, from microsome-beads prior to the start of an experiment, to better model drug metabolism.

In an example relating to any of the above aspects, the microsomes are human microsomes, such as HLM, HKM, human lung microsomes and HIM. In an example, to remove the microsomes, the microsomes are bounded to magnetizable beads to create microsome-beads. For example, to bind the microsomes to the magnetizable beads, the microsomes are mixed with the magnetizable beads in a container by a mixer. The container may also include a buffer, such as tris(hydroxymethyl)aminomethane (TRIS) buffer, phosphate buffer, bicarbonate buffer, 4-(2-hydroxyethyl)-1-piperazineethanesulfonic acid (HEPES) buffer or citrate buffer or a combination thereof. In an example, the buffer has a pH of from about 4.0 to lower to about 9.0 or higher, such as a pH of from about 6.9 to about 7.5, for example, a pH of from about 6.9 to about 7.9, such as a pH of 7.2, 7.4, 7.6 and 7.8.

In an example relating to any of the above aspects, the magnetizable beads include a coating, such as a silica coating, dextran coating, or polystyrene coating or a combination thereof to make silica-coated beads, dextran-coated beads, and polystyrene-coated beads, or beads comprised of a combination of surface materials, respectively. In an example, the microsomes bind to the magnetizable beads via an interaction between phospholipids and the surface of the magnetizable beads. In particular, silica beads contain negatively charged silanol groups in solutions of neutral pH that promote phospholipid binding to their surfaces.

In an example relating to any of the above aspects, each of the magnetizable beads may include a surface area from about 0.1 $mm^2$ or less to about 50 $mm^2$ or more, such as from about 0.1 $mm^2$ to about 10 $mm^2$, from about 0.2 $mm^2$ to about 8 $mm^2$, from about 0.3 $mm^2$ to about 7 $mm^2$, from about 0.4 $mm^2$ to about 6 $mm^2$, from about 0.6 $mm^2$ to about 5 $mm^2$, from about 0.7 $mm^2$ to about 4 $mm^2$, from about 0.8 $mm^2$ to about 3 $mm^2$, from about 0.9 $mm^2$ to about 2 $mm^2$, from about 1 $mm^2$ to about 8 $mm^2$, from about 1 $mm^2$ to about 6 $mm^2$, from about 1 $mm^2$ to about 5 $mm^2$, from about 2 $mm^2$ to about 8 $mm^2$, from about 3 $mm^2$ to about 8 $mm^2$, from about 2 mm² to about 6 mm², or for example, from about 1 mm² to about 5 mm².

The concentration of the magnetizable beads in the container or the solution in the container may be dependent on the size and surface area of each of the plurality of magnetizable beads. For example, the concentration of the magnetizable beads in the solution in the container can be from about $1.0 \times 10^3$ beads/mL or less to about $1.0 \times 10^{10}$ or more, such as from about $1.0 \times 10^5$ beads/mL to about $1.0 \times 10^8$ beads/mL, from about $1.0 \times 10^2$ beads/mL to about $1.0 \times 10^{12}$ beads/mL, from about $1.0 \times 10^4$ beads/mL to about $1.0 \times 10^9$ beads/mL, from about $1.0 \times 10^5$ beads/mL to about $1.0 \times 10^8$ beads/mL, from about $1.0 \times 10^6$ beads/mL to about $1.0 \times 10^9$ beads/mL, about $1.0 \times 10^3$ beads/mL, about $1.0 \times 10^4$ beads/mL, about $1.0 \times 10^5$ beads/mL, about $1.0 \times 10^6$ beads/mL, about $1.0 \times 10^7$ beads/mL, about $1.0 \times 10^8$ beads/mL, about $1.0 \times 10^9$ beads/mL, about $1.0 \times 10^{10}$ beads/mL.

In an example relating to any of the above aspects, to predict an in vivo hepatic intrinsic clearance ($CL_{int}$) from in vitro data a plurality of magnetizable beads is first washed in a buffer and then added to a container, which may contain a buffer. Microsomes, such as HLM are added to the container. The container is then placed in a mixer to mix the HLMs with the magnetizable beads for a sufficient amount of time for at least some of the HLMs to bind to the magnetizable beads to form HLM-beads. In an example, the composition containing the formed HLM-beads includes a drug and any cofactors or additives required for a metabolic reaction. The amount of time where the HLMs are mixed or incubated with the magnetizable beads may be from about 0.1 minutes or less to about 90 minutes or more, such as about 0.3 minutes or more, about 1 minutes, about 2 minutes, about 3 minutes, about 4 minutes, about 5 minutes, about 6 minutes, about 7 minutes, about 8 minutes, about 9 minutes, about 10 minutes, about 12 minutes, about 14 minutes, about 16 minutes, about 18 minutes, about 20 minutes, about 25 minutes, about 30 minutes, about 35 minutes, about 40 minutes, about 45 minutes, about 50 minutes, about 55 minutes, about 60 minutes, about 65 minutes, about 70 minutes, about 75 minutes, about 80 minutes, about 85 minutes, about 90 minutes, about 95 minutes, about 100 minutes, about 105 minutes, about 110 minutes, about 120 minutes, about 180 minutes, about 240 minutes, or, for example, from about 0.3 minutes to about 60 minutes.

In an example relating to any of the above aspects, the hepatic clearance ($CL_h$) may be predicted from the $CL_{int}$ value using the following three equations representing the hepatic well-stirred model (Equation 1), hepatic parallel tube model (Equation 2) and the hepatic dispersion model (Equation 3):

$$CL_h = \frac{Q \times f_{u,blood} \times \frac{CL_{int}}{f_{u,mic}}}{Q + \left(f_{u,blood} \times \frac{CL_{int}}{f_{u,mic}}\right)} \quad \text{Equation 1}$$

$$CL_h = Q \times \left(1 - e^{\frac{-f_{u,blood} \times CL_{int}}{Q \times f_{u,mic}}}\right) \quad \text{Equation 2}$$

$$CL_h = Q \times \left(1 - \frac{4a}{(1+a)^2 \times e^{-\frac{1-a}{2D_N}} - (1-a)^2 e^{-\frac{1+a}{2D_N}}}\right) \quad \text{Equation 3}$$

wherein Q is hepatic blood flow in mL*min⁻¹*kg⁻¹, $f_{u,mic}$ is fraction of compound unbound to the microsome-beads, and $f_{u,blood}$ is the free fraction of compound that is not bound to proteins in blood, $D_N$ is the axial dispersion number, $R_N$ is the efficiency number, $a=(1+4D_N R_N)^{1/2}$ blood binding constant and $CL_{int}$ the intrinsic clearance of the organ which can be calculated from metabolite formation data using the following equation.

$$CL_{int} = \frac{V_{max}}{K_m \times \text{mg of microsomes incubation}} \times \frac{xx \text{ mg of microsomes}}{\text{g of organ}} \times \frac{xx \text{ g of organ}}{\text{kg of body weight}} \quad \text{Equation 4}$$

Where $V_{max}$ is the maximum velocity of the enzyme reaction, $K_m$ is the Michaelis constant which is defined as the substrate concentration associated with a $1/2\ V_{max}$. Alternatively, the $CL_{int}$ of the organ can be calculated from compound depletion data using the following equation.

$$CL_{int} = k_{el} \times \frac{\text{mg of microsomes}}{\text{g of organ}} \times \frac{\text{g of organ}}{\text{kg of body weight}} \times \frac{\text{mL of incubation}}{\text{mg of microsomes in incubation}} \quad \text{Equation 5}$$

Where $k_{el}$ is the elimination rate constant of the disappearance of the compound during the incubation.

In an example relating to any of the above aspects, the container containing the HLM-beads is subjected to a magnetic field created by a magnet for a sufficient amount of time to separate the HLM-beads in the aqueous composition, thus creating a supernatant. For example, the container containing the HLM-beads may be subjected to a magnetic field for at least 0.1 minutes, such as about 0.3 minutes, 0.5 minutes, 1 minutes, 1.5 minutes, 2 minutes, 3 minutes, or 5 minutes. The separated HLM-beads are removed from the container by a magnetic tube rack and washed with a buffer to conduct a binding study or assay.

In an example relating to any of the above aspects, the protein content in the supernatant can then be measured to determine the amount of microsomes bound to the magnetizable beads. The HLM-beads may also be assessed for their ability to catalyze some typical metabolic reactions. Moreover, a processor and a non-transitory machine-readable storage medium that includes instructions executable by the processor to determine drug metabolism based on the protein content of the microsomes in the supernatant.

In an example relating to any of the above aspects, the in vivo hepatic intrinsic clearance ($CL_{int}$) from in vitro data may be derived using suitable scaling parameters such as liver weight, liver blood flow, body weight, and amount of microsomes per gram liver.

Additional embodiments relating to any of the above aspects may be deciphered from the examples provided below. The following examples are not meant to be limiting.

EXAMPLES

Example 1: Use of HLM-Beads to Assess Drug Metabolism

In this example, microsome-beads prepared using HLM (HLM-beads) are characterized and used to assess the metabolism of 2 CYP450 and 3 UGT substrates. A comparison between the enzyme activity of HLM and HLM-beads show that HLM-beads can improve enzyme kinetics, particularly for UGT enzymes. Furthermore, metabolism of a substrate using HLM-beads can be extended by exchanging expired HLM-beads with freshly prepared beads.

Materials

HLMs (Lot 38291) were acquired from Corning Inc (Woburn, MA). Alamethicin, amodiaquine, estradiol (E2), estradiol-3-(β-D-glucuronide), fatty acid-free human serum albumin (HSA), magnesium Chloride, β-Nicotinamide adenine dinucleotide 2'-phosphate reduced tetrasodium salt hydrate (NADPH), egg-yolk-derived phosphatidylcholine (PC), potassium phosphate dibasic, potassium phosphate monobasic, propofol, propofol glucuronide, saccharolactone, Trizma base, uridine diphosphoglucuronic acid (UDPGA), zidovudine (AZT), zidovudine glucuronide were purchased from Sigma Aldrich Inc. (St. Louis, MO). 3'-Azido-3'-deoxythymidine β-D-glucuronide and 3'-Azido-3'-deoxythymidine-methyl-d3 β-D-glucuronide was obtained from Toronto Research Chemicals Inc. Magnetizable beads (silica- and dextran) from G-Biosciences (St. Louis, MO) were acquired from Thermofisher Scientific (Waltham, MA). Polystyrene beads manufactured by GE-Healthcare were purchased from Thermofisher Scientific.

Methods:

Bead Counting

Magnetizable bead count was calculated from microscopic analysis on a Nikon Ti-E microscope using bright field microscopy, 10× objective, and disposable Neubauer hemocytometers. The beads were diluted 1000× in 50 mM potassium phosphate buffer (pH 7.4) and imaged after a period of 5-10 minutes to allow the beads to settle on the bottom of the slide chamber. The region of interest for each picture was set to the size of one square representing 1 mm$^3$ of volume on the hemocytometer. The beads were counted using proprietary software from Nikon (NIS elements, Nikon Inc.).

Bead Imaging

Labeling of HLM on beads was conducted using a glibenclamide-fluorophore drug conjugate targeted to HLM (ER-Tracker™ RED (BODIPY™ TR Glibenclamide, ThermoFisher Scientific Inc.). Beads dispensed into individual wells on a 24-well 1.5 coverslip plate were imaged using a Nikon CFI Plan Apochromat VC 60× oil objective. Z-stacked confocal images of the beads (81 images in total) were captured using an emission wavelength of 697.5 nm and a Crestoptics X-Light confocal attachment on a Nikon TiE microscope. Image analysis and processing were conducted using proprietary software from Nikon (NIS elements, Nikon Inc.). Quantification of HLM and HSA.

HLM and HSA concentrations were measured using the Bradford, coomassie blue assay. Briefly, 100-300 μL of Coomassie Plus™ protein detection reagent (Thermofisher Scientific, Waltham, MA), was added to individual wells on a 96-well clear-bottom plate. A set volume of sample (2-10 μL) was added to the well to initiate the formation of color. Quantification of protein was conducted using an external bovine serum albumin standard curve employing equivalent volumes of standard as was used in the assay. Adsorption of HLM and HSA onto magnetizable beads was calculated from the difference in HLM concentration in the media before and after exposure to the magnetizable beads.

Preparation of Phosphatidylcholine Liposomes and Measurement of Phospholipids in Liposomes and HLM Phosphatidylcholine (PC) liposomes were prepared by drying 0.1 mg/mL of egg yolk PC in ethanol under a stream of nitrogen for 4 h. Distilled water (4 mL) was added to the resulting micelles. The suspension was vortexed and passed through a 100 nm filter (15 passes) on a LiposoFast liposomal preparation apparatus. The resulting suspension of 100 nm diameter liposomes or 20 mg/mL HLM was then quantified by using a phospholipid detection kit which measures the choline moiety of the phospholipid following cholinesterase-mediated cleavage from the long carbon chain of the fatty acid (Biovision, Milpitas CA).

Comparison of PC, HSA and HLM Binding to Beads

HLMs are composed of a mixture of proteins and phospholipids. To evaluate which of these two components most effectively bind to the magnetizable beads, a comparison of magnetic bead binding between protein (HSA as a surrogate for HLM proteins), HLM and phospholipids (PC as a surrogate for HLM phospholipids) was undertaken. A concentration of 0.5 mg/mL HLM was prepared in phosphate buffer (50 mM), pH 7.4. The concentration of PC used was set to be equivalent to the concentration of phospholipids in 0.5 mg/mL HLM. The concentration of HSA used was 0.5 mg/mL to approximate the same concentration of protein in HLM. Incubations were started by washing the magnetizable beads (13.1×10$^9$ beads) three times with phosphate buffer. The supernatant was removed from the beads and replaced with 1 mL of HLM, PC or HSA solutions. Equivalent incubations without beads were also prepared as controls. Binding to the beads was carried out for 30 min at a temperature of 4° C. Following the binding period, the solutions were subjected to a magnetic field for 5 min. The supernatant was assayed for phospholipid and protein content as described above. All studies were conducted in triplicate.

Assessment of the Relationship Between HLM Binding and Bead Content

Magnetizable beads in quantities of 2.2, 5.5, 11 and 21×10$^9$ beads were washed 3× in phosphate buffer (pH 7.4, 50 mM). Aliquots of each bead mixture (95 μL) were dispensed into a 96-well plate with a v-shaped bottom. HLM stock solutions (5 μL) were added to each well at concentrations of 0.2, 0.5, 0.8 or 1 mg/mL. The plate was sealed with a silicone mat. The plate was incubated at 4° C. with constant rotation for a period of 30 min. The plate was then centrifuged for 30 seconds at 1000 rpm and then placed onto a 96-position ring magnet to separate the beads from the buffer. Protein remaining in the buffer was quantified using the Bradford reagent.

Assessment of HLM Retention onto Silica Magnetizable Beads

Magnetizable beads (530×10$^9$ beads, 500 μL) were washed 3 times in 1 mL 50 mM potassium phosphate buffer pH 7.4. HLMs were added to prepared beads, or buffer alone at a final concentration of 1 mg/mL. The mixture was incubated for 30 min at 4° C. on a rotating shaker. Magnetizable beads were separated from the solution using a magnetic tube rack (Dynamag-2, Life Technologies Inc.). Protein remaining in the supernatant was quantified from a 10 μL sample. The supernatant was replaced with 1 mL of 50 mM phosphate buffer, pH 7.4. The contents of the tube were vortexed for 5 seconds and subjected to the magnet. The protein remaining in the supernatant was quantified from a 10 μL sample. The process of replacing the buffer, vortexing and quantifying the protein in the supernatant was repeated 4 more times.

CYP2C8 and CYP3A4 Metabolic Assays

53×10$^9$ beads (washed 3× in 50 mM phosphate buffer, pH 7.4) were subjected to 1 mL of HLM at a concentration of 1 mg/mL. The HLMs were allowed to bind to the beads for 30 min at a temperature of 4° C. under constant rotation to form HLM-beads. Following the binding period, the HLM-beads were washed 5× in phosphate buffer (pH 7.4) and resuspended in 1 mL of 100 mM phosphate buffer. Incubation mixtures consisted of 100 mM potassium phosphate buffer (pH 7.4) and 0.02 mg/mL HLM. The mixture was then incubated at 37° C. for 5 minutes. Midazolam and amodiaquine (20 μM-0.005 μM) were added to the incubated samples and reactions were initiated with 2 mM NADPH. Reactions were stopped by adding 0.1 μM Labetalol in 100:0.1 acetonitrile: formic acid. Metabolite formation was assessed by LC-MS/MS. 1'hydroxymidazolam and desethylamodiaquine were quantified on a Waters Acquity UPLC with an Acquity UPLC BEH C18, 1.7 μm, 2.1×50 mm, (40° C.) column and a SciEx Triple Quad 6500+ using Analyst software (Version 1.7). Solvent A: 95% $H_2O$+ 5% acetonitrile+0.1% formic acid, Solvent B: acetonitrile+ 5% acetonitrile+0.1% formic acid. Assay conditions and multiple reaction monitoring (MRM) transitions used are shown in Tables 1 and 2 below, respectively.

mentioned above. Incubation mixtures consisted of HLM, probe substrates, UDPGA (5.0 mM), alamethicin (0.25 μg/mL), saccharolactone (5.1 mM), $MgCl_2$ (8.0 mM), Tris-Cl (100 mM), pH 7.8. Reaction mixtures containing HLM, alamethicin, saccharolactone, and $MgCl_2$ were pre-incubated at 37° C. for 15 min followed by the addition of substrate and 5 min incubation at 37° C., the reaction was then initiated by addition of pre-warmed UDPGA and incubated at 37° C. At the end of the incubation, the reaction was quenched by addition of equal volume ice-cold acetonitrile containing formic acid (0.1%) and internal standard (IS), AZT ($d_3$) glucuronide (0.25 μM). The reaction rates were determined by LC-MS/MS quantification of the glucuronide products formed. All the metabolites were eluted through an

TABLE 1

CYP450 assay conditions

| Target enzyme | HLM concentration (mg/ml) | Probe substrate | Concentration range (μM) | Metabolite |
|---|---|---|---|---|
| CYP2C8 | 0.02 | amodiaquine | 0.005-20 | desethylamodiaquine |
| CYP3A | | midazolam | | 1'hydroxymidazolam |

TABLE 2

CYP450 metabolite MRM transitions

| Target enzyme | Ion Mode | Analyte | Mass transition Q1 | Mass transition Q3 | IS | Mass transition Q1 | Mass transition Q3 |
|---|---|---|---|---|---|---|---|
| CYP2C8 | + | desethylamodiaquine | 328.0 | 282.0 | labetalol | 329.0 | 294.3 |
| CYP3A | + | 1' hydroxymidazolam | 342.0 | 324.0 | | | |

Glucuronidation Assays for UGT1A1, UGT1A9, and UGT2B7

To evaluate the effect of magnetizable beads treatment on the activity of UGTs, the kinetics parameters of UGT1A1, 1A9 and 2B7 in HLM were determined in the presence and absence of magnetizable beads. HLM was prepared as Agilent Zorbax SB-C18, 50×2.1 mm, 5 μm column and quantified using SciEx QTRAP 4000. Metabolite concentrations were determined using Analyst software (version 1.6). Assay conditions and MRM transitions used are shown in Tables 3 and 4 below, respectively.

TABLE 3

UGT Assay Conditions

| Target enzyme | HLM concentration (mg/ml) | Probe substrate | Concentration range (μM) | Metabolite |
|---|---|---|---|---|
| UGT1A1 | 0.050 | E2 | 1.5-120 | E2 3-glucuronide |
| UGT1A9 | 0.10 | propofol | 4-1500 | propofol glucuronide |
| UGT2B7 | 0.050 | AZT | 50-7500 | AZT glucuronide |

TABLE 4

UGT metabolite MRM transitions

| Target enzyme | Ion Mode | Analyte | Mass transition Q1 | Mass transition Q3 | IS | Mass transition Q1 | Mass transition Q3 |
|---|---|---|---|---|---|---|---|
| UGT1A1 | − | E2 3-glucuronide | 447.1 | 271.1 | AZT ($d_3$) glucuronide | 445.1 | 128.1 |
| UGT1A9 | − | propofol glucuronide | 353.1 | 177.1 | | | |
| UGT2B7 | − | AZT glucuronide | 442.1 | 125.0 | | | |

Relayed Metabolism of Midazolam

Magnetizable beads ($53 \times 10^9$ beads) were prepared as described in CYP3A and UGT metabolism sections. HLM-beads were prepared in triplicate and stored in 2 mL of 50 mM phosphate buffer, pH 7.4. The reaction was started by adding 100 µL of HLM-beads to a 50 mL conical polypropylene tube containing 19.9 mL of a solution of phosphate buffer (50 mM, pH 7.4), NADPH (2 mM) and midazolam (1 µM). Samples (50 µL) were taken from the incubation every 20 min up to 160 min. After the collection of each sample, the HLM-beads were separated from the buffer with a magnet and transferred to a new tube. A fresh aliquot of HLM-beads (100 µL) was added to the tube. Control HLM suspension incubations were performed in parallel. HLM suspension incubations were treated the same as the incubations with the HLM-beads with the exception of no addition of new HLM after 20 min. The content of midazolam and 1'OH midazolam were quantified by LC-MS/MS. The content of 1'OH midazolam formed was not corrected for the addition of fresh HLM-beads as the volume of beads added or samples taken only amounted to approximately 5% of the total volume of the original incubation solution.

Metabolism Data Fitting

The kinetic parameters, $K_m$ and $V_{max}$ were obtained through fitting the metabolism data using Equations 1, 2 or 3, depending on the best fit based on the Akaike criterion. Equation 1 describes typical Michaelis-Menten kinetics, Equation 2 describes Michaelis-Menten kinetics in the presence of substrate-level inhibition whereby $K_i$ is the inhibitory constant, and Equation 3 describes allosteric sigmoidal kinetics whereby h is the hill constant and $K_{half}$ is the concentration of substrate ([S]) required to achieve a velocity that is half of $V_{max}$.

$$v = \frac{V_{max} \times [S]}{K_m + [S]} \quad \text{Equation 1}$$

$$v = \frac{V_{max} \times [S]}{\left(K_m + \left([S] \times \left(1 + \frac{[S]}{K_i}\right)\right)\right)} \quad \text{Equation 2}$$

$$v = \frac{V_{max} \times [S] \times h}{(K_{half} \times h + ([S] \times h))} \quad \text{Equation 3}$$

Results

Figure 2:
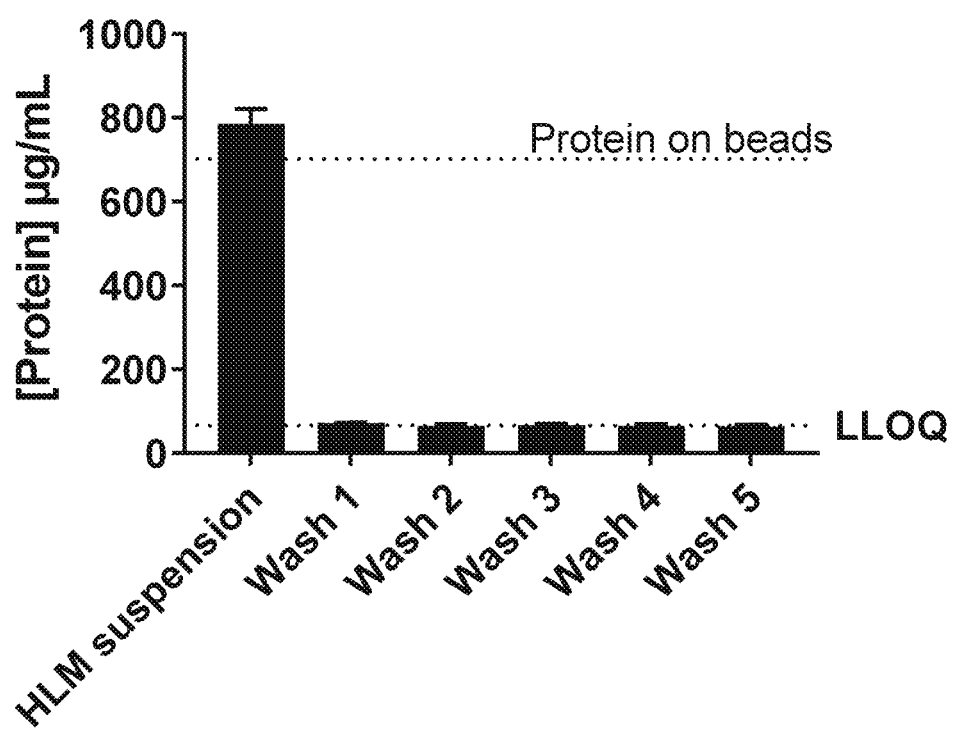
FIG. 2 illustrates protein content in the media before and after treatment with magnetizable beads ($53 \times 10^9$ beads/mL) and the protein content in the media following multiple wash steps, according to an example of the present disclosure.

The mean radius of the beads was determined to be 2.6 µm, which was in agreement with the manufacturer's stated size of 2.5-5.0 µm. The relationship between the number of beads and the percentage of HLM bound at various concentrations of HLM is shown in FIG. 1. Both HLM and bead content affected the percentage of HLM bound to the beads. The data could be sufficiently described using a one-site binding model with top and bottom constraints set to 100 and 0% respectively. Over 90% of HLM (1 mg/mL) could be bound using $21 \times 10^9$ beads (200 µL of stock bead volume). Marked agglomeration of the beads was observed under microscopic examination and the appearance of the mixture of beads in phosphate buffer (50 mM, pH 7.4) changed from a uniform and flat appearance to a muddy appearance Microsomal Binding to Magnetizable Beads To assess whether HLMs were capable of resisting multiple wash steps following binding to magnetizable beads, the protein concentration in the supernatant of the HLM-beads suspension was measured after magnetizable bead treatment. Protein concentration in a 1 mL mixture of HLM in a buffer (1 mg/mL) was reduced by 90% by the magnetizable beads ($53 \times 10^9$ beads). Adsorbed protein was resistant to dissociation from the beads for at least 5 washes (maximum number of washes evaluated) using phosphate-buffered saline (50 mM, pH 7.4) as indicated by the absence of quantifiable protein in the buffer fraction after each wash step (see FIG. 2).

Assessment of Phospholipid or Protein Binding to Beads

Figure 3:
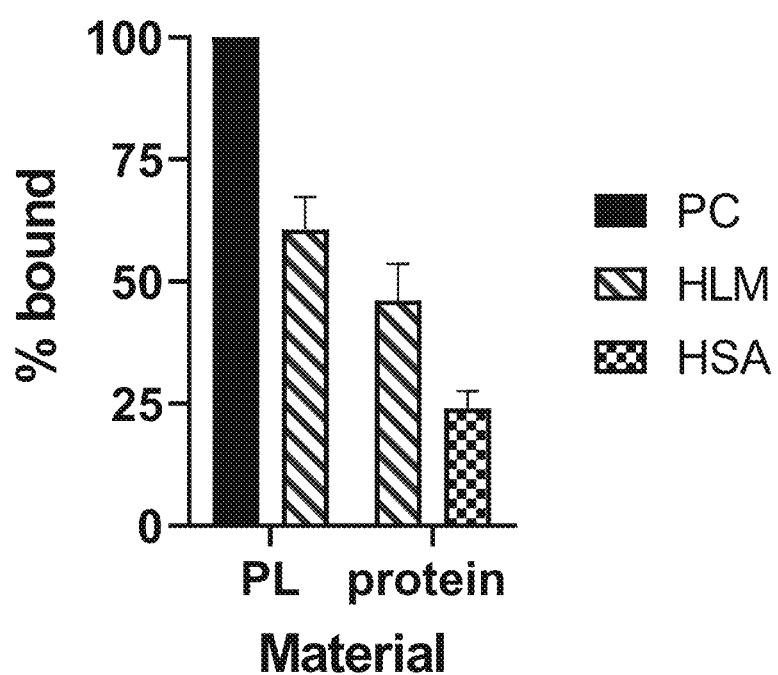
FIG. 3 illustrates the quantification of human liver HLM-associated protein or phospholipid bound to the magnetizable beads in comparison to pure phospholipid (PL) or pure protein (human serum albumin, HSA). The more extensive binding of PL indicate that it is the phospholipid component of HLM that are predominantly mediating strong binding to the magnetizable bead, according to an example of the present disclosure.

A comparison of PC and HSA was conducted to better understand how HLM are bound to the beads. PC at concentrations equivalent to 0.5 mg/mL HLM (41 nmol/mL) was completely bound to the magnetizable beads whereas only 24% of HSA (0.5 mg/mL) was bound to the magnetizable beads. This is in contrast to approximately 50 to 60% of HLM phospholipid or protein bound to the beads (FIG. 3).

The HLM Magnetic Bead System Changes the Kinetics of Drug Metabolism Enzymes

HLM-beads were assessed for their ability to catalyze some typical metabolic reactions. Two major CYP450 reactions, CYP2C8-mediated amodiaquine de-ethylation, and CYP3A-mediated midazolam 1' hydroxylation as well as three major UGT reactions, UGT1A1-estradiol 3-β-glucuronidation, UGT1A9-propofol glucuronidation and UGT2B7-zidovudine glucuronidation were assessed.

Figure 4:
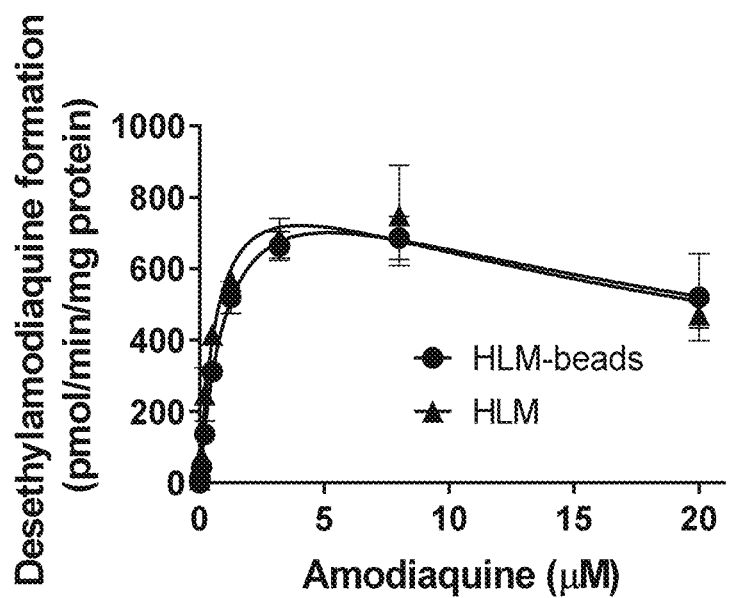
FIG. 4 illustrates the enzyme kinetics of amodiaquine and midazolam metabolism in HLM suspensions vs. HLM-beads. Panel A: Hyperbolic curve of CYP2C8-catalyzed amodiaquine deethylation. Panel B: Hyperbolic curve of midazolam 1'hydroxylation according to an example of the present disclosure.
Figure 4:
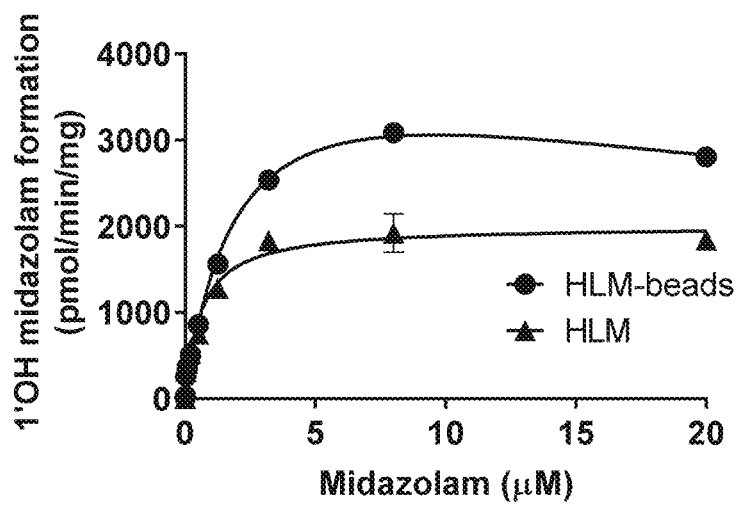

CYP450 activity using HLM-beads showed similar enzyme kinetic profiles in comparison to HLM suspension incubations (FIG. 4). Measured $K_m$ values were approximately 2× higher for CYP2C8 amodiaquine deethylation and 3× higher for midazolam 1'hydroxylation than observed using HLM suspensions, however, $V_{max}$ values were approximately the same for CYP2C8 and approximately 2× higher for CYP3A4. Overall, the difference in intrinsic clearance ($Cl_{int}$) between HLM-beads and HLM suspensions was within 2 fold, as shown in Table 5, below.

TABLE 5

Kinetic parameters describing the metabolism of amodiaquine and midazolam in HLM suspensions and HLM-beads

| Parameter | Amodiaquine (CYP2C8) | | Midazolam (CYP3A) | |
|---|---|---|---|---|
| | HLM$^{SI}$ | HLM-beads$^{SI}$ | HLM$^{MM}$ | HLM-beads$^{SI}$ |
| $K_m$, µM | 0.732 ± 0.11 | 1.21 ± 0.08$^{ns}$ | 0.612 ± 0.086 | 2.04 ± 0.23$^{sig}$ |
| $V_{max}$, pmol/min/mg | 982 ± 89 | 1030 ± 87$^{ns}$ | 2002 ± 66 | 4350 ± 249$^{sig}$ |
| $CL_{int}$, µL/min/mg | 1341 | 851 | 2828 | 2132 |

MM, Michaelis-Menten modeling used; ns, not significantly different from parameter generated using HLM; SI, substrate inhibition modeling used; sig, significantly different from parameter generated using HLM (P < 0.05).

Figure 5:
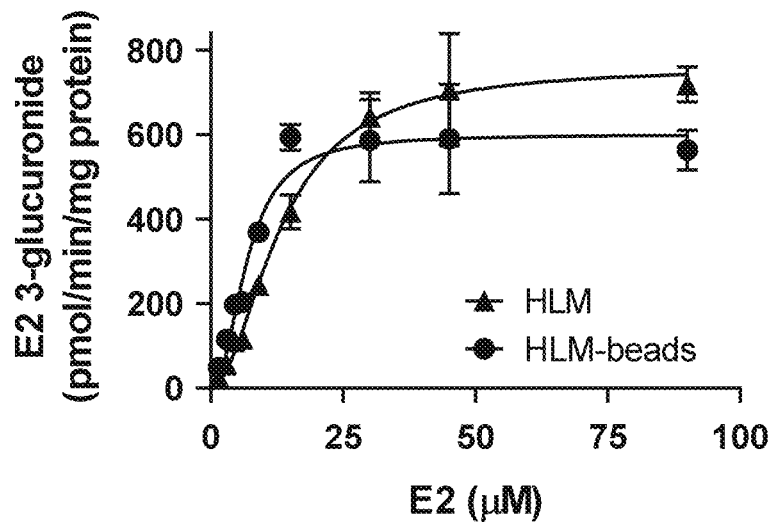
FIG. 5 illustrates the enzyme kinetics of estradiol (E2), propofol and zidovudine (AZT) glucuronidation in HLM suspensions vs. HLM-beads. Panel A: Sigmoidal curve of UGT1A1 catalyzed E2 3-glucuronidation. Panel B: Hyperbolic curve of UGT1A9-mediated propofol glucuronidation. Panel C: Hyperbolic curves of UGT2B7-mediated AZT glucuronidation, according to an example of the present disclosure.
Figure 5:
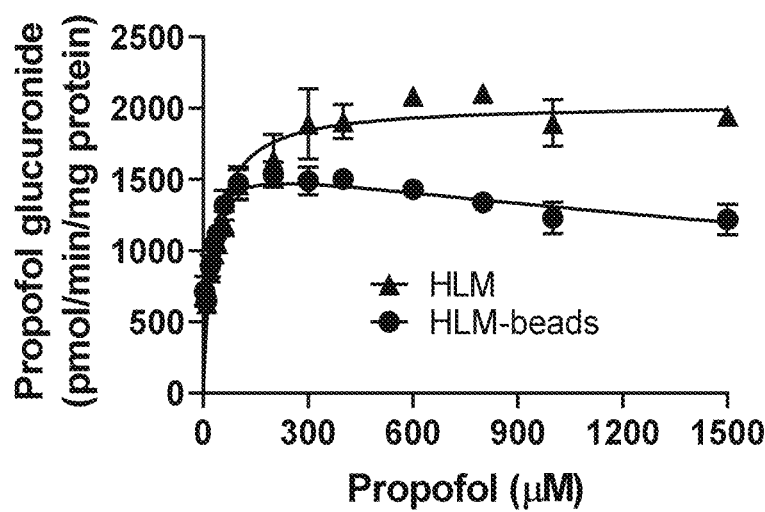
Figure 5:
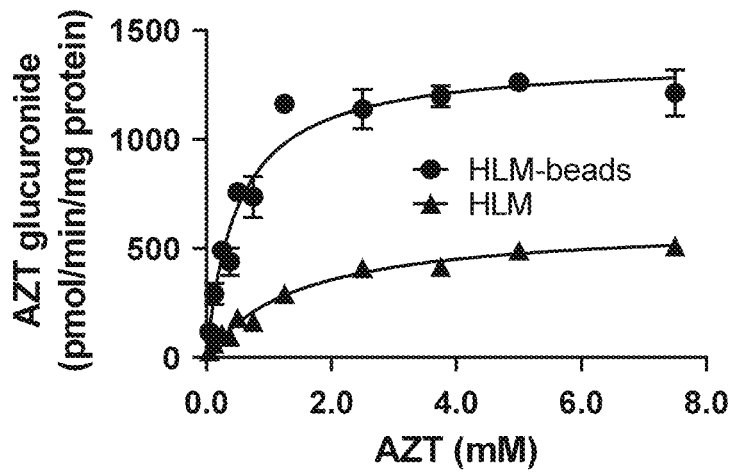

The difference between the UGT kinetics profile of HLM-beads vs. HLM suspensions was more varied than observed for CYPs (FIG. 5). For UGT1A1, the $S_{50}$ value of E2 3-glucuronide formation was 2× lower in HLM-beads in comparison to HLM suspensions, while the $V_{max}$ is comparable in both systems, thus the overall V/K or $CL_{int}$ is 1.5-fold higher in the HLM-beads than in HLM suspensions. For UGT1A9, substrate inhibition effects were more noticeable using HLM-beads. In addition, the $K_m$ value was approximately 3× lower using HLM beads in comparison to HLM suspensions, while $V_{max}$ remained approximately the same. Overall, $Cl_{int}$ was approximately 2× higher using HLM-beads in comparison to HLM suspensions. For UGT2B7, a markedly lower $K_m$ was observed that was approximately 3× lower for HLM-beads vs. HLM suspensions. In addition, the $V_{max}$ values were approximately 2× higher using HLM-beads vs. HLM suspensions. Overall, $Cl_{int}$ was approximately 6× higher using HLM beads vs. HLM suspensions, as shown in Table 6 below.

disrupting properties of drug-delivering silica nanoparticles, which manifest clinically as hemolytic toxicity.

Phospholipids are negatively charged at neutral pH, and as such, electrostatic interactions are less likely to contribute to their binding. Instead, binding of phospholipids to silica surfaces may be associated with Van Der Waals forces. Despite the anticipated electrorepulsive interactions of the negatively charged phosphate head of the phospholipid and silanol groups on the surface of the magnetizable beads, marked adsorption of silica nanoparticles to phospholipid membranes has been shown to occur at neutral pH, although higher binding is observed in solutions with lower pH. It is also possible that binding of HLM to silica beads is at least partially mediated by synergistic interactions between membrane-associated proteins and phospholipids.

TABLE 6

Kinetic parameters of UGT1A1, UGT1A9, and UGT2B7 in HLM suspensions and HLM-beads

| | E2 (UGT1A1) | | | Propofol (UGT1A9) | | AZT (UGT2B7) | |
|---|---|---|---|---|---|---|---|
| Parameter | HLM$^{AS}$ | HLM-beads$^{AS}$ | Parameter | HLM$^{SI}$ | HLM-beads$^{SI}$ | HLM$^{MM}$ | HLM-beads$^{MM}$ |
| $S_{50}$, µM | 13 ± 1 | 6.8 ± 0.6$^{sig}$ | $K_m$, µM | 30 ± 4 | 13 ± 2$^{sig}$ | 1400 ± 0.1 | 490 ± 0.06$^{sig}$ |
| $V_{max}$, pmol/min/mg | 761 ± 34 | 600 ± 25$^{sig}$ | $V_{max}$, pmol/min/mg | 2029 ± 49 | 1635 ± 66$^{sig}$ | 614 ± 21 | 1366 ± 42$^{sig}$ |
| $CL_{int}$, µL/min/mg | 59 | 88 | $CL_{int}$, µL/min/mg | 68 | 126 | 0.44 | 2.8 |

$^{AS}$allosteric sigmoidal modeling used;
$^{MM}$Michaelis-Menten modeling used;
ns, not significantly different from parameter generated using HLM;
$^{SI}$substrate inhibition modeling used;
$^{sig}$significantly different from parametergenerated using HLM (P < 0.05).

Relaying HLM-Beads

Figure 6:
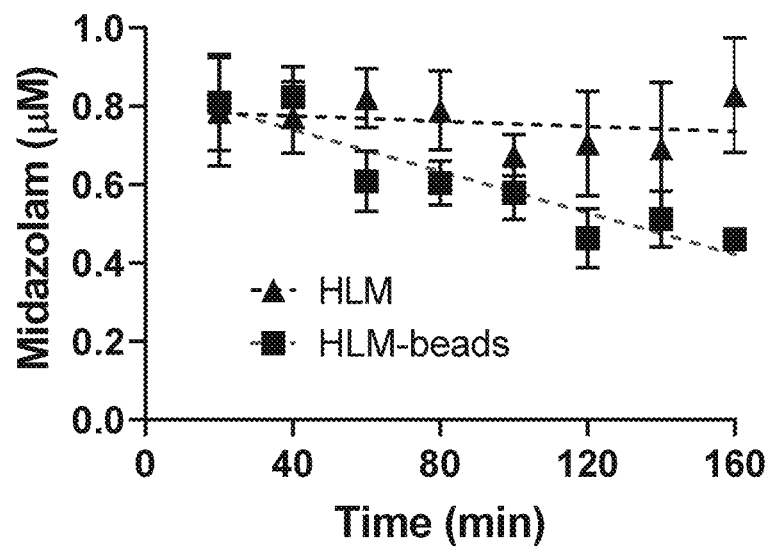
FIG. 6 illustrates two graphs showing data from a HLM-bead relay strategy to deplete midazolam (Panel A) and form 1'OH midazolam (Panel B), according to an example of the present disclosure.
Figure 6:
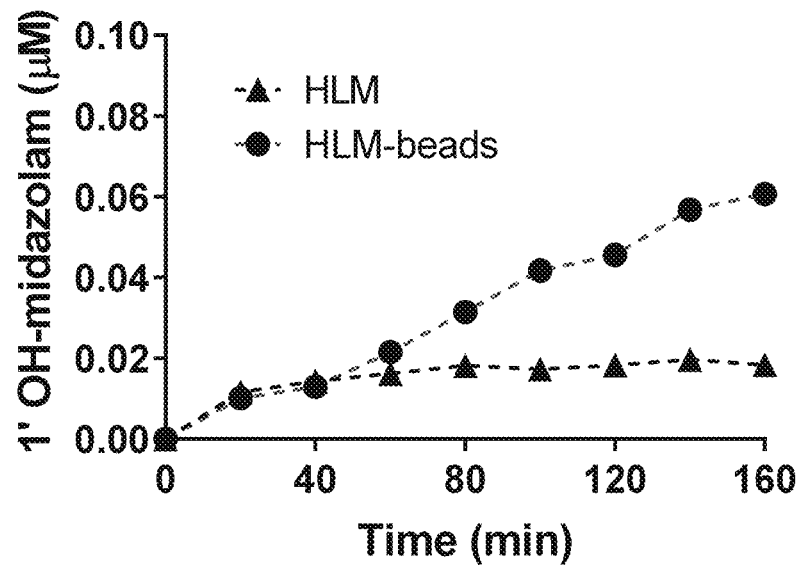

Metabolism of midazolam while relaying the incubation mixture with new HLM-beads every 20 minutes is shown in FIG. 6. A low concentrations of HLM (0.005 mg/ml) was used in this study to greatly decrease the rate of midazolam metabolism. By exchanging used HLM-beads with fresh HLM-beads during the same incubation, continued metabolism of midazolam could be observed as either perceptible turnover of parent midazolam from the incubation or continued formation of its primary metabolite 1'OH midazolam. Using HLM suspensions, rapid formation of 1'OH midazolam formation could be observed for up to 20 minutes, followed by a markedly slower rate of 1'OH midazolam formation up to the last time point (160 minutes). No perceptible depletion of parent midazolam was observed using HLM suspensions.

Discussion

A recent proteomic analysis of HLM material has shown that the total protein mass of HLM is made up of 600 different proteins with the top 10 proteins making up as much as 20% of HLM protein mass. As HLMs have been shown to possess a multitude of proteins with differing tertiary and quaternary structures, it is possible that one or more unique proteins could markedly contribute to HLM binding to silica beads. Alternatively, binding of HLM to the bead surface could be mediated by interactions between the bead surface and HLM phospholipids of which PC is the most abundant.

As shown in FIG. 1, the percentage of HLM bound to the beads is dependent on both bead content and HLM concentration and that the binding of HLM to beads could be described by a one site binding equation. The binding of HLM to the beads was surprisingly (FIG. 2) strong. The interactions between silica beads and phospholipids have been well-documented and implicated in the membrane- Additional studies using polymeric magnetizable beads with a different surface chemistry (polystyrene) were also found to exhibit strong binding to HLM; however, it is notable that beads coated with a layer of dextran showed comparably weak binding to HLM (data not shown). Polymeric beads have also been shown to bind to liposomes, bicelles, and cardiolipin.

As shown in FIG. 4, HLM-beads demonstrated CYP450 drug metabolizing activity that was comparable to the activity observed using HLM suspensions. The $CL_{int}$ of CYP450 substrates in incubations with HLM-beads was 0.63 to 0.75-fold lower for CYPs 2C8 and 3A4, respectively in comparison to values from suspension HLM. The lower $CL_{int}$ observed in HLM-beads was associated with a general increase in the $K_m$ of the reaction for both CYPs 2C8 and 3A4 accompanied by a similar $V_{max}$ for CYP2C8 and a greater than 2-fold increase in $V_{max}$ for CYP3A4. For CYP2C8, remarkable similarity in enzyme kinetics profile of HLM-beads vs. HLM suspensions suggests that the beads did not have any noticeable effect on CYP2C8 activity as indicated by a lack of significance in the differences in kinetic parameters between the two systems (FIG. 4A). For CYP3A4, a statistically significant increase in the $V_{max}$ value was also associated with a potential decrease in activity at the highest concentration that is suggestive of substrate level inhibition. An accompanying statistically significant increase in the $K_m$ of the reaction resulted in a slight decrease in the $CL_{int}$ of midazolam (FIG. 4B). Factors that could potentially affect enzyme activity of HLM when bound to the beads are non-specific binding of substrate to beads, altered positioning of the HLM around bead aggregates that may obscure some percentage of HLM exposure to substrate or indirect effects on enzyme activity due to the alteration of membrane properties. Non-specific binding of midazolam and 1'OH midazolam to the MGBS was not observed from bioanalysis of the supernatant component following a 30 min incubation of beads (5.3×10$^9$ beads); strongly suggesting that non-specific binding does not change enzyme kinetics of CYP3A. Atomic models of CYPs 1A2, 2A6, 2C9, 2D6, 2E1 and 3A4 suggests that the catalytic site of these isoforms is at least partially immersed in the phospholipid bilayer of the endoplasmic reticulum thus it is conceivable that alterations of the bilayer could also affect positioning of the CYP active site such that activity could be altered. It is known that CYP450 activity can be affected by membrane composition and that membrane components of the endoplasmic reticulum can form ordered (rigid) or disordered (fluid) microdomains that certain CYPs may prefer to localize to. It is conceivable that binding of phospholipids, saturated lipids, or unsaturated lipids to the surface of the beads could result in a change in the composition of the microsomal membrane in such a way as to enhance the activity of certain enzymes.

Interestingly, as shown in FIG. 5, the $CL_{int}$ of estradiol (UGT1A1), propofol (UGT1A9) and AZT (UGT2B7) via glucuronidation was higher in HLM-beads vs HLM suspensions which was largely driven by a marked decrease in the observed $K_m$ for each reaction. In the case of AZT glucuronidation, $CL_{int}$ that was approximately 6-fold higher was associated with a 2-fold increase in $V_{max}$ value and a 3-fold decrease in the $K_m$ value. These data are surprising in their contrast to the more moderate effects of the beads on CYP450 activity. A possible explanation for these differences in enzyme activity would be the impact of the multiple washing steps on the content of free fatty acids associated with HLM-beads. Free fatty acids such as arachidonic, oleic and linoleic acids can exists as contaminants remaining from HLM preparations. These fatty acids have been shown to be competitive inhibitors of UGT1A9 and UGT2B7 activity (Rowland et al., 2007; Rowland et al., 2008). To mitigate the inhibitory effects of these fatty acids, fatty acid-binding serum albumin is typically added to HLM suspensions at concentrations that balance the positive effects of fatty acid binding with the undesirable effects of substrate binding (Rowland et al., 2007). Inclusion of small concentrations of fatty acid-free albumin to in vitro incubations has been shown to increase the activity of certain enzymes found in HLM including UGTs 1A9 and 2B7. More specifically, addition of fatty acid-free albumin led to an overall decrease in the binding affinity of 4-methylumbelliferone for UGT1A9. Other UGTs including UGT2B7 were also similarly affected by fatty acid free albumin (Rowland et al., 2007). However, this effect of albumin was not observed with UGT1A1 (Rowland et al., 2008). This is a notable observation, as decreasing $K_m$ values for UGT1A9 and UGT2B7, but not UGT1A1, were also observed with HLM-beads vs. HLM suspensions. This suggests that for UGT activities, the binding of HLM to the beads appears to have a similar effect as adding fatty acid-free albumin to the incubation. Interestingly, for UGT1A9 and UGT2B7, $V_{max}$ values were significantly different in HLM-beads vs. HLM. For UGT1A9, $V_{max}$ was slightly lower with HLM-beads vs. HLM. For UGT2B7, $V_{max}$ was markedly higher with HLM-beads vs. HLM. The changes in $V_{max}$ values using HLM-beads were not observed in HLM incubations using albumin (Rowland et al., 2007) suggesting that the beads may be contributing additional effects on UGT activity such as alteration of membrane composition described above. If HLM-bead washing results in the removal of inhibitory free fatty acids, incubations in the absence of inhibitory free fatty acids could be conducted in the absence of serum albumin. Alternatively, it may also be possible to introduce serum albumin into the wash steps to augment removal of free fatty acids from the HLM.

This study also demonstrates that enzymatically functional membrane-bound proteins could be immobilized onto silica-coated beads and that magnetism can be leveraged to extend the length of an incubation using a relay approach. Based on data illustrated in FIG. 6, the calculated $CL_{int}$ clearance from midazolam depletion data was determined to be 842 µL/min/mg HLM protein. Using the well-stirred model, a blood flow value of 21 mL/min/kg, a liver weight value of 1800 g, a body weight value of 70 kg and a midazolam $f_u$ value of 0.02, the hepatic blood clearance of midazolam equates to 9.47 mL/min/kg; which is in line with the blood clearance of midazolam (8.59 mL/min/kg) reported in the literature. It is important however to note that the concentration of midazolam used in this study (1 µM) is considered too close to the $K_m$ to accurately predict $CL_{int}$ using the substrate depletion approach. Indeed, by using $V_{max}/K_m$ from the values shown in Table 2, the predicted hepatic clearance of midazolam is higher (14.2 mL/min/kg).

Magnetic bead technology has helped to advance existing purification processes by averting long centrifugation steps and enabling higher throughput through automation. In this study, the same concepts were applied to demonstrate that enzymatically functional membrane-bound proteins could be immobilized onto magnetizable beads and that magnetism can be leveraged to extend the length of an incubation using a relay approach. Indeed, further characterization of this technology that is currently ongoing such as non-specific binding of drugs to beads, investigations on finding optimal bead surface coatings, size or ferromagnetic materials will help optimize binding performance and magnetic separation speed. In addition, although binding of functional HLM to beads has been demonstrated in this study, the physicochemical principles underlying the binding of biological material to bead surface material are applicable to any phospholipid- or protein-based system such as fractions from other cellular organelles or even complete cells. As such, functional assays are not restricted to biotransformation reactions, but could also include drug transport or receptor binding studies.

Example 2: Use of HLM-Beads to Assess Non-Specific Binding to HLM

In this example, a strategy for using HLM-beads to assess non-specific binding of compounds to HLM is described and assessed by comparing the free fraction of compound ($f_{u,mic}$) determined using equilibrium dialysis with $f_{u,mic}$ values determined using HLM-beads for 13 compounds. The results indicate that HLM-beads can provide $f_{u,mic}$ values that are comparable to those obtained using equilibrium dialysis. Furthermore, use of the HLM-beads to assess non-specific binding of compounds to HLM requires only a few minutes of incubation as opposed to hours of incubation typically needed for equilibrium dialysis.

Materials

Clozapine, diclofenac, diltiazem, imipramine, itraconazole, nevirapine, tolbutamide, warfarin and verapamil were obtained from Sigma-Aldrich Corp. (St. Louis, MO, USA). Alprazolam, chlorpromazine, diazepam and midazolam were purchased from Cerilliant Corp. (Round Rock, TX, USA). BIRT2584 was synthesized in-house (Boehringer Ingelheim Pharmaceuticals, Ridgefield, CT, USA). Diclofenac-d$_4$, (+/−)-verapamil-d$_3$ and warfarin-d$_5$ were purchased from CDN Isotopes (Point-Claire, Quebec, Canada).

HLM (Lot 38291, mixed gender 150 donors) were acquired from Corning Inc. (Glendale, AZ, USA). Silica-coated magnetizable beads (catalog #501036426) were obtained from G-Biosciences (St. Louis, MO, USA). Coomassie Plus—The Better Bradford Assay Reagent and Pre-Diluted Protein Assay Standards: Bovine Serum Albumin (BSA) set were purchased from Thermo Fisher Scientific (Waltham, MA, USA). Rapid equilibrium dialysis (RED) device was obtained from Thermo Fisher Scientific Pierce Labs (Waltham, MA, USA).

Methods

Figure 7:
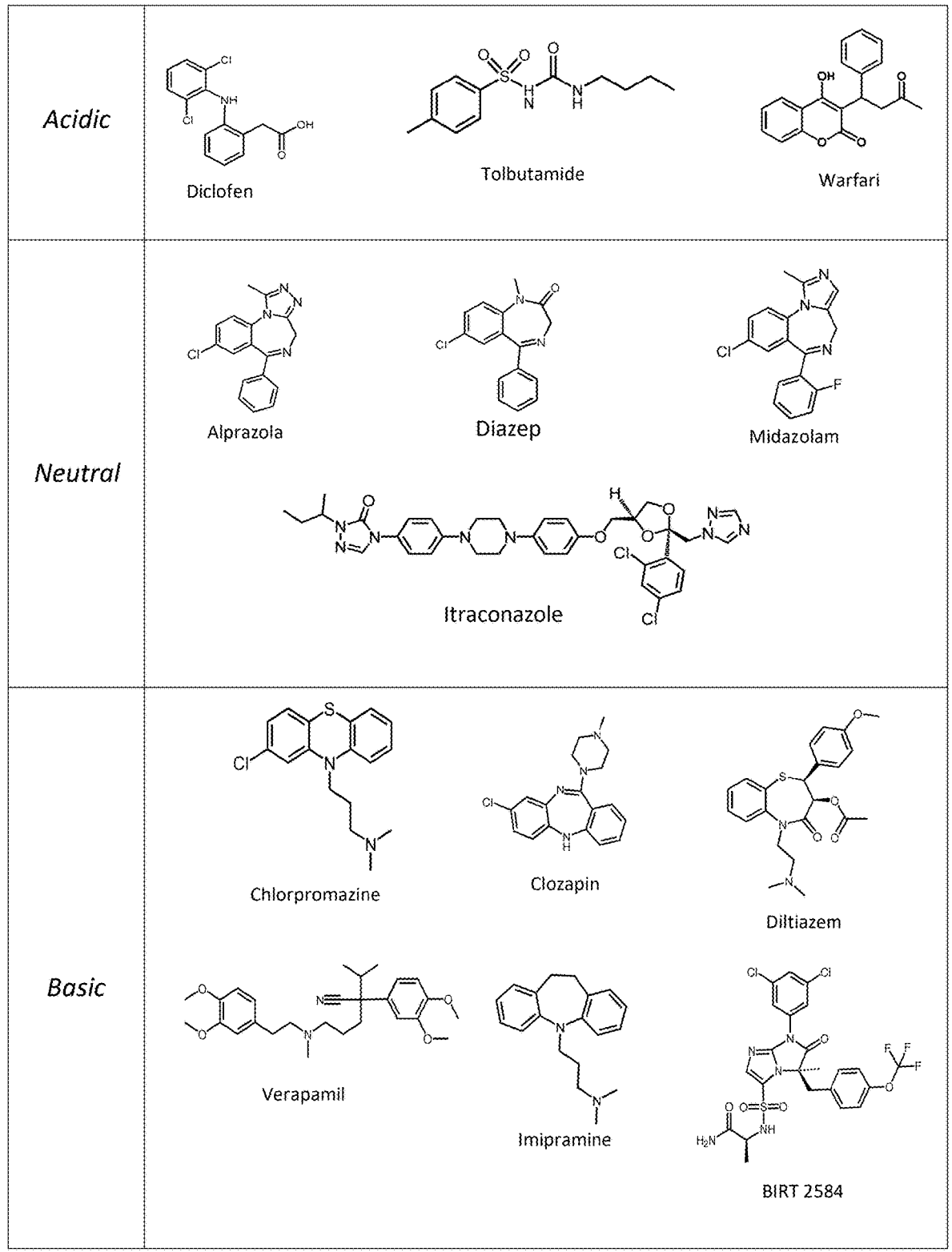
FIG. 7 illustrates a set of acidic, neutral or basic chemicals used to assess non-specific binding of chemicals to HLM using HLM-beads, according to an example of the present disclosure.

Selection of compounds. Alprazolam, chlorpromazine, clozapine, diazepam, diclofenac, diltiazem, imipramine, itraconazole, midazolam, tolbutamide, warfarin, verapamil and BIRT 2584 were selected for the HLM microsomal binding studies. The structure and physicochemical properties of the compounds are listed in FIG. 7 and Table S1, respectively. Diclofenac-$d_4$, nevirapine, (+/−)-verapamil-$d_3$ and warfarin-$d_5$ were used as internal standards (IS) for LC-MS/MS analysis.

Microsomal binding of all tested compounds was evaluated at 1.0 µM and at HLM concentrations of 0.025, 0.50 or 1.0 mg/ml.

Volume determination of the aqueous phase of the beads stock solution. 100, 250, 500 and 1000 µl of well-suspended magnetizable beads (beads) from G-Biosciences were aliquoted into four 1.5 ml microcentrifuge tubes. The supernatants were carefully removed using a magnetic tube rack (Dynamag-2, Life Technologies Inc.) and the volume of the extracted liquid was measured.

Time course of HLM binding to beads. The stock HLM suspension (20 mg/ml, 30 µl) was diluted into phosphate buffer (50 mM, pH 7.4, 570 µl) (PB) to produce a HLM suspension (1.0 mg/ml, 600 µl). Well-suspended beads from the manufacturer (100 µl) were aliquoted into a 1.5 ml microcentrifuge tube. The supernatant was removed using a magnetic tube track and the beads were washed three times using 600 µl of PB each time. After the final wash, the supernatant was removed from the beads. The HLM suspension (1.0 mg/ml, 600 µl) was then mixed with the beads. The protein content of the supernatant of the mixture (5.0 µl) was measured at 0.25, 0.50, 1.0, 5.0 and 10 minutes (min) after the initiation of the incubation. The HLM suspension prepared (1.0 mg/ml) prior to the exposure to beads was used as a control. The total supernatant removed at the end of the experiment was <5% of the initial incubation volume. The protein content in each sample was measured using Bradford Coomassie Blue Assay. Briefly, Coomassie reagent (300 µl) was added into individual wells on a 96-well clear-bottom plate followed by addition of a sample (5.0 µl). Protein content was quantified using a bovine serum albumin standard curve. The free fraction of protein remaining in the supernatant at each incubation time point was compared to the protein content of the HLM suspension without beads. Protein content at each time point was determined in triplicate.

Determination of the HLM binding capacity of beads. Well-suspended beads (500 µl) were aliquoted into a 1.5 ml microcentrifuge tube and washed as described above. After washing, the beads were resuspended into 390 µl PB to bring the suspension volume back up to 500 µl. Sixteen aliquots (30 µl of each) of the suspension were dispensed into individual microcentrifuge tubes and supernatants were removed as described above. HLM suspension (1.0 mg/ml, 1.0 ml) was then added to the first tube containing beads, gently mixed by inverting the tube 5-6 times and incubated for 5 min at 4° C. After the incubation, the suspension was subjected to a magnetic field and an aliquot of the supernatant (3.0 µl) was taken for protein quantification. The remaining suspension was then transferred to a second tube containing free beads, mixed gently and incubated for 5 min at 4° C. After the incubation, the suspension was subjected to a magnetic field and the supernatant (3.0 µl) was taken for protein quantification. The procedure was repeated until protein content in the supernatant no longer decreased with the addition of beads. The total volume of supernatant removed from the suspension was <5% of the total initial volume. The protein content in each sample was quantified as described above. A sample of the HLM suspension (1.0 mg/ml, 3.0 µl) taken prior to the exposure to the beads was used as a control. Adsorption of HLM onto beads was determined by comparing the protein content in the supernatant before and after the addition of HLM to the beads. The determination was performed in triplicate.

Preparation of HLM-beads for microsomal binding study or assay. Well-suspended beads (200 µl) were aliquoted into a 1.5 ml microcentrifuge tube and washed as described above. All the solvent was removed after the last wash and replaced with HLM (20 mg/ml, 50 µl) and PB (906 µl). The suspension was gently mixed and incubated at 4° C. for 5 min. The resulting HLM-bead suspension was previously determined to be equivalent to a 1.0 mg/ml HLM suspension in 1.0 ml PB.

Time course of compound binding to HLM-beads. The progress of compound binding to HLM-beads was studied using diazepam, clozapine and imipramine. HLM-beads (1.0 mg/ml, 1.5 ml) were aliquoted into 2 ml microcentrifuge tubes and equilibrated at 37° C. for 5 min, then the supernatant was removed. Pre-warmed (37° C.) test compound (1.0 µM, 1.5 ml) was mixed with the HLM-beads. The suspension was incubated at 37° C. on an orbital shaker set to 750 rotations per minute (rpm). At 1.0, 2.5, 5.0, 10, 15 and 30 min after initiation of incubation, an aliquot of supernatant (10 µl) was mixed with an equal volume of acetonitrile (ACN) containing formic acid (FA, 0.1%) and IS. The preparation was then centrifuged at 3500 revolutions per minute (RPM) at 4° C. for 10 min. The compound solution in the absence of HLM-beads was taken as to. The total volume of sample taken at the end of experiment was <5% of the initial incubation volume. The samples were then analyzed using LC-MS/MS. The compound free fraction at each incubation time point was calculated according to Equation 4.

$$\text{Compound free fraction} = \frac{[\text{Compound}]_t}{[\text{Compound}]_{t0}} \qquad \text{Eq.4}$$

Where $[\text{Compound}]_t$ represents the compound concentration in the supernatant at any given incubation time point and $[\text{Compound}]_{t0}$ is the time point before the addition of HLM-beads. The incubations were performed in duplicate.

Microsomal binding study or assay using HLM-beads. HLM-beads (equivalent to 1.0 mg/ml HLM) were prepared as described above and diluted in PB to achieve HLM concentrations equivalent to 0.025 and 0.50 mg/ml. Aliquots of HLM-beads (150 µl) were dispensed into PCR tubes. The supernatant in each of the tubes was removed using a 96-well magnetic plate. The test compounds (1.0 µM, 150 µl) were added into the PCR tubes containing the HLM-beads. The suspension was gently mixed, then incubated for 5 min, at 750 rpm on an orbital shaker set to 37° C. The supernatant (75 µl) was then removed and mixed with an equal volume of ACN (0.1% FA, IS) followed by centrifugation at 3500 RPM, 4° C. for 10 min. The compound solution in the absence of HLM-beads was used as a control. The concentration of the free test compound in the supernatants was analyzed by LC-MS/MS. The $f_{u,mic}$ value was calculated according to Equation 5. The incubations were conducted in triplicate.

$$f_{u,mic} = \frac{[\text{Compound}]_{+HLM-beads}}{[\text{Compound}]_{PB}} \quad \text{Eq. 5}$$

[Compound]$_{+HLM-beads}$ and [Compound]$_{PB}$ represent the compound concentrations in the supernatants with HLM-beads and with PB only, respectively.

Microsomal binding study or assay using rapid equilibrium dialysis (RED) The RED device consists of inserts in a 48-position plate. Each insert consists of a compound donor and receiver compartment, separated by a cellulose dialysis membrane (M.W. cutoff, 8 kDa). Test compound (200 µl) and HLM (0.025, 0.50 or 1.0 mg/ml) were added to the donor compartment and PB (400 µl) was added to the receiver compartment. The samples were then incubated on an orbital shaker set to 65 rpm for six hours at 37° C. At the end of incubation, 25 µl of sample from each chamber was removed and equalized by adding an equal volume of buffer to the donor samples and an equal volume of HLM (free of test compound) to the receiver samples. An aliquot of each sample was diluted 4-fold with ACN (0.1% FA, IS) followed by centrifugation at 3500 RPM, 4° C. for 10 min. the test compounds remaining in the supernatant were then analyzed by LC-MS/MS. The $f_{u,mic}$ was calculated according to Equation 6.

$$f_{u,mic} = \frac{[\text{Compound}]_{receiver}}{[\text{Compound}]_{donor}} \quad \text{Eq. 6}$$

Where [Compound]$_{donor}$ and [Compound]$_{receiver}$ represent the concentrations of compound in the donor and receiver compartments, respectively. The incubations were performed in triplicate.

For compounds such as chlorpromazine, itraconazole and BIRT 2584, that extensively adsorb onto materials in the RED device, a second experiment was conducted whereby the RED inserts were pre-soaked with test compound (1.0 µM) prior to the binding assay. The experimental procedures were identical as described above except that each compartment of the device was pre-incubated with the test compound in PB for 30 min. All the test compound solutions were removed and the binding assays were performed as described previously. The incubations were performed in triplicate.

LC-MS/MS analysis. Compounds were eluted by reverse phase HPLC using a Waters Acquity or an Agilent 1290 series ultrahigh performance pump. A Waters Acquity ultrahigh performance liquid chromatography (UPLC) ethylene-bridged hybrid (BEH), C18, 1.7 µm, 2.1×50 mm, part #188002350). An Applied Biosystems 5000 or 6500 Qtrap mass spectrometer equipped with electron spray ionization source in multiple reaction monitoring mode was used for detection.

The mobile phases A and B for all analytes were water (0.1% FA) and ACN (0.1% FA), respectively. The MRM transitions of the analytes are compiled in Table 7. Quantitation of test compounds was achieved by comparing the peak area ratios of analyte over IS to test compounds with known concentration, i.e. standard curve.

TABLE 7

MRM transitions of test compounds and IS

| | | Ionization Mode | Q1 | Q3 |
|---|---|---|---|---|
| Acidic | Diclofenac | + | 296.0 | 250.0 |
| | Tolbutamide | − | 269.1 | 170.0 |
| | Warfarin | − | 306.7 | 161.0 |
| Neutral | Alprazolam | + | 309.1 | 205.1 |
| | Diazepam | + | 285.1 | 193.0 |
| | Itraconazole | + | 705.1 | 392.2 |
| | Midazolam | + | 325.9 | 291.0 |
| Basic | Chlorpromazine | + | 319.1 | 246.1 |
| | Clozapine | + | 327.0 | 270.0 |
| | Diltiazem | + | 414.9 | 178.1 |
| | Imipramine | + | 281.3 | 86.1 |
| | Verapamil | + | 455.3 | 165.1 |
| | BIRT 2584 | + | 608.0 | 563.1 |
| IS | Warfarin-d$_5$ | − | 321.3 | 161.0 |
| | Diclofenac-d$_4$ | + | 300.0 | 254.0 |
| | Verapamil-d$_3$ | + | 458.3 | 165.1 |
| | Nevirapine | + | 267.1 | 226.0 |

Results

Characterization of the HLM-beads system. Characterization of the HLM-beads was conducted with respect to the time required for HLM binding to the beads reaching completion and the HLM loading capacity of the beads.

Figure 8:
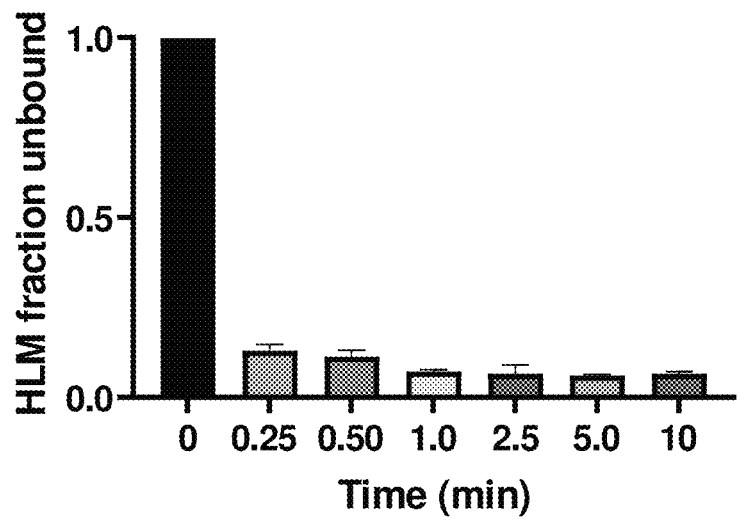
FIG. 8 illustrates the content of HLM bound to magnetizable beads at increasing time points after combining a suspension of magnetizable beads with a suspension of HLM, according to an example of the present disclosure.

Previously, a 30-minute incubation time was used to ensure that the binding of HLM to the beads reaches completion (Example 1) To optimize the time required for HLM binding to the beads, the time course of HLM binding to the beads was investigated. As shown in FIG. 8, HLM binding to the beads reached completion approximately 1.0 min after the incubation was initiated. Thus, to ensure consistency in incubation time and minimizing the time required to complete binding, the incubation time for HLM binding to beads was set to 5 min. Incorporation of more automated techniques could reduce incubation time even further.

In this work, the unit describing the HLM-binding capacity of the beads is based on the volume of the manufacturer-supplied suspension of beads (stock beads). To maintain the concentration of the stock beads during the experiments, washed beads were reconstituted in an equivalent volume of incubation buffer as the initial volume removed from the stock beads. The wet volume of the beads used in this study was determined to be 22±3% of the volume of the stock beads.

Figure 9:
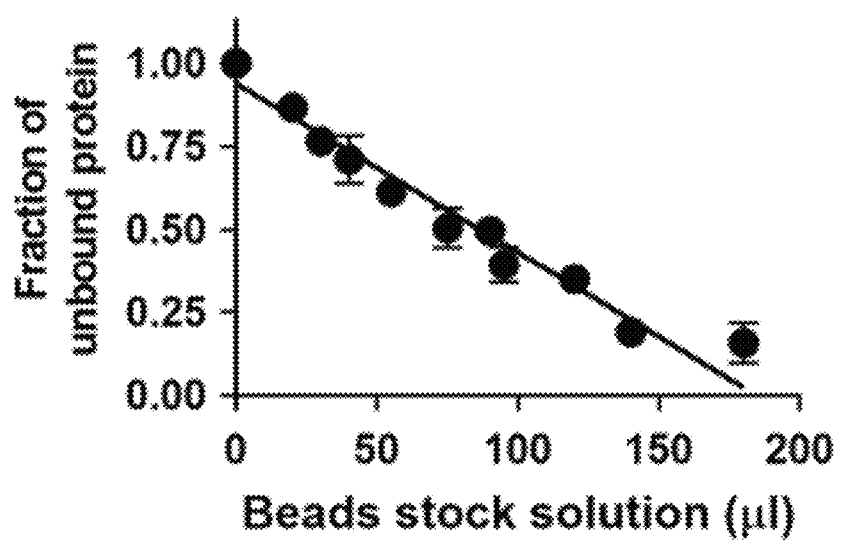
FIG. 9 illustrates the content of HLM protein remaining in the media after adding increasing volumes of magnetizable bead suspension, according to an example of the present disclosure.

To determine the HLM-binding capacity of the beads, washed beads were titrated into HLM (1.0 mg/ml, 1.0 ml). The protein remaining in the supernatant after each addition of beads was quantified and normalized to the protein content of a 1.0 mg/ml suspension of HLM (without beads), FIG. 9. It was determined that 185±13 µl of stock beads was required to completely bind 1.0 mg of HLM. In subsequent studies, complete binding of HLM was accomplished by incubating 200 µl of the manufacturer-supplied suspension of beads with each mg of HLM used in an incubation.

Figure 10:
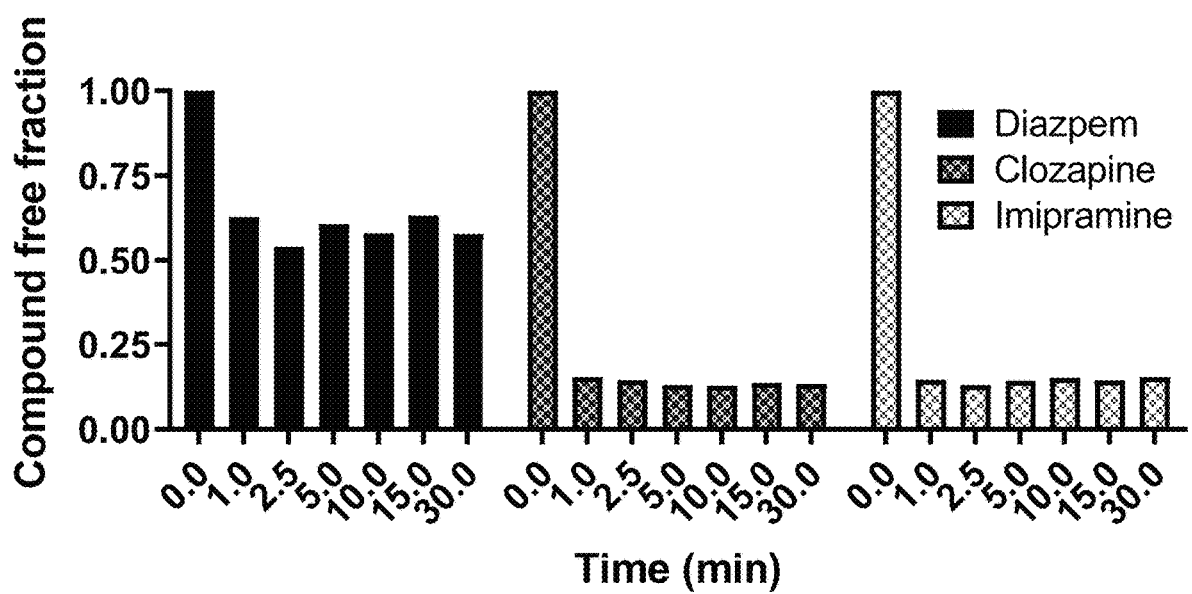
FIG. 10 illustrates the content of free diazepam, clozapine or imipramine at increasing time points after adding to a suspension of HLM-beads (1 mg/mL). The results indicate that the completion of binding equilibrium takes place within 1 min of adding the compound, according to an example of the present disclosure.

Time course of test compound binding to HLM-beads. The time required for compound binding to HLM was investigated using three moderately bound compounds, diazepam, clozapine and imipramine. As shown in FIG. 10, binding reaches completion only 1 to 2.5 min after the start of the incubation. A 5 min incubation time was then used in subsequent experiments to ensure that the completion of binding achieved.

Microsomal binding study or assay using HLM-beads & RED. The $f_{u,mic}$ values of a set of 13 test compounds obtained using HLM-beads and RED in three HLM concentrations were plotted in FIG. 11 and compiled in Tables 8, 9 and 10.

TABLE 8

$f_{u,mic}$ values obtained by HLM-beads and RED systems - HLM 0.025 mg/ml

| | Acidic compounds | | | Neutral compounds | | | |
|---|---|---|---|---|---|---|---|
| | Diclofenac | Warfarin | Tolbutamine | Alprazolam | Diazepam | Itraconazole | Midazolam |
| HLM-beads | 0.94 (0.09)[a] | 1.02 (0.01) | 0.93 (0.07) | 0.81 (0.06) | 1.0 (0.1) | 0.24 (0.04) | 1.02 (0.01) |
| RED | 0.98 (0.02) | 0.97 (0.05) | 0.98 (0.02) | 0.98 (0.14) | 0.96 (0.01) | 0.29 (0.07)[b] | 0.98 (0.14) |
| $\frac{HLM-\text{beads}}{RED}$ | 0.96 | 1.1 | 0.96 | 0.82 | 1.1 | 0.84 | 1.0 |

| | Basic compounds | | | | | |
|---|---|---|---|---|---|---|
| | Chlorpromazine | Clozapine | Diltiazem | Imipramine | Verapamil | BIRT2584 |
| HLM-beads | 0.79 (0.13) | 0.96 (0.06) | 0.99 (0.04) | 0.94 (0.04) | 1.0 (0.1) | 0.43 (0.04) |
| RED | 0.71 (0.02)[b] | 0.87 (0.06) | 0.96 (0.03) | 0.94 (0.04) | 1.0 (0.1) | 0.42 (0.05)[b] |
| $\frac{HLM-\text{beads}}{RED}$ | 1.1 | 1.1 | 1.0 | 0.99 | 1.0 | 1.0 |

[a] Parentheses represent the standard deviation;
[b] Data obtained using the pre-soak method.

TABLE 9

$f_{u,mic}$ values obtained by HLM-bead and RED systems - HLM 0.50 mg/ml

| | Acidic compounds | | | Neutral compounds | | | |
|---|---|---|---|---|---|---|---|
| | Diclofenac | Warfarin | Tolbutamine | Alprazolam | Diazepam | Itraconazole | Midazolam |
| HLM-beads | 0.92 (0.03)[a] | 1.02 (0.04) | 1.01 (0.04) | 0.78 (0.06) | 0.82 (0.07) | 0.10 (0.01) | 0.76 (0.02) |
| RED | 0.93 (0.04) | 0.94 (0.03) | 0.98 (0.03) | 1.0 (0.1) | 0.77 0.02) | 0.036 (0.005)[b] | 0.67 (0.06) |
| $\frac{HLM-\text{beads}}{RED}$ | 0.99 | 1.1 | 1.0 | 0.77 | 1.1 | 2.8 | 1.1 |

| | Basic compounds | | | | | |
|---|---|---|---|---|---|---|
| | Chlorpromazine | Clozapine | Diltiazem | Imipramine | Verapamil | BIRT2584 |
| HLM-beads | 0.11 (0.02) | 0.48 (0.01) | 1.2 (0.1) | 0.35 (0.01) | 0.59 (0.04) | 0.064 (0.021) |
| RED | 0.084 (0.005)[b] | 0.42 (0.05) | 0.77 (0.09) | 0.40 (0.03) | 0.56 (0.05) | 0.024 (0.003)[b] |
| $\frac{HLM-\text{beads}}{RED}$ | 1.4 | 1.1 | 1.5 | 0.88 | 1.1 | 2.7 |

[a] Parentheses represent the standard deviation;
[b] Data obtained using the pre-soak method.

TABLE 10

$f_{u,mic}$ values obtained by HLM-bead and RED systems - HLM 1.0 mg/ml

| | Acidic compounds | | | Neutral compounds | | | |
|---|---|---|---|---|---|---|---|
| | Diclofenac | Warfarin | Tolbutamine | Alprazolam | Diazepam | Itraconazole | Midazolam |
| HLM-beads | 0.87 (0.17)[a] | 0.97 (0.03) | 0.92 (0.04) | 0.68 (0.07) | 0.66 (0.03) | 0.073 (0.004) | 0.53 (0.02) |
| RED | 0.83 (0.08) | 0.86 (0.08) | 0.97 (0.03) | 1.0 (0.1) | 0.64 (0.02) | 0.025 (0.001) | 0.52 (0.08) |
| $\frac{HLM-\text{beads}}{RED}$ | 1.0 | 1.1 | 0.95 | 0.66 | 1.0 | 2.9 | 1.0 |

TABLE 10-continued $f_{u,mic}$ values obtained by HLM-bead and RED systems - HLM 1.0 mg/ml Basic compounds

|  | Chlorpromazine | Clozapine | Diltiazem | Imipramine | Verapamil | BIRT2584 |
|---|---|---|---|---|---|---|
| HLM-beads | 0.056 (0.006) | 0.26 (0.02) | 0.97 (0.03) | 0.19 (0.01) | 0.32 (0.03) | 0.035 (0.004) |
| RED | 0.0437 (0.0003)[b] | 0.30 (0.02) | 0.76 (0.12) | 0.26 (0.01) | 0.43 (0.06) | 0.019 (0.002)[b] |
| $\frac{HLM-beads}{RED}$ | 1.3 | 0.85 | 1.3 | 0.71 | 0.74 | 1.9 |

[a]Parentheses represent the standard deviation;
[b]Data obtained using the pre-soak method.

For compounds that demonstrated extensive adsorption onto the RED device (i.e. chlorpromazine, itraconazole and BIRT2584), the microsomal binding studies using RED were conducted with and without pre-soaking the apparatus with 1.0 µM of compound.

Statistics

Comparisons between $f_{u,mic}$ values determined using HLM-beads and RED were conducted using a two-tailed Pearson Correlation analysis and linear regression. Both statistical analyses were conducted using GraphPad Prism (version 8.3.0).

Discussion

HLM are vesicular subcellular fractions composed of endoplasmic reticulum. They are commonly used to study hepatic metabolism in support of small-molecule drug development. Previously, we demonstrated that HLM can bind strongly to silica-coated magnetizable beads and that these HLM-beads retain functional drug metabolizing enzymes (Example 1).

Detailed characterizations of the HLM-beads system demonstrated that the binding of HLM to beads is a fast event, reaching completion within 1 min after combining the HLM with the beads (FIG. 3). The binding capacity of the beads is determined to be 185 µL of stock beads/mg HLM (FIG. 4). The capacity of the beads to capture HLM is dependent on the total surface area of each bead, which is inversely related to the diameter of each bead. As such, it is likely that HLM-loading capacity varies with the size of bead. Because the beads used in this study (G-Biosciences, catalog #501036426) are not uniform in size (2.5-4.5 µm), it would be imprecise to express HLM binding capacity based on bead count or beads surface area per mg of HLM without further characterization of the beads. Since all the studies in this example rely on only one source of beads, binding of HLM to the beads is normalized to the stock volume of the beads mixture (with the assumption that bottle-to-bottle variability is minimal). If the physical characteristics of the beads differ across batches, HLM-binding capacity should be conducted for each batch.

The ease with which the HLM-beads could be separated from their incubation media prompted the current study to explore the application of the HLM-beads as a tool to assess the binding of small molecules to HLM.

Non-specific binding of small molecules to microsomes is a well-known in vitro artifact that can contribute to inaccurate projection of clearance from in vitro data or the inaccurate determination of concentration-dependent enzyme kinetic constants such as the Michaelis constant ($K_m$), reversible inhibition constant ($K_i$) or inactivation constant ($K_I$). Assessment of the non-specific binding of small molecule drug candidates to HLM can help to predict hepatic clearance or metabolic DDI more accurately and is recommended by major regulatory agencies. Equilibrium dialysis is the most common method used to determine the $f_{u,mic}$. However, equilibrium dialysis studies often require long incubation times (4-24 hours) for test compounds to achieve concentration equilibrium across the dialysis membrane.

Three moderate binders, diazepam, clozapine and imipramine, were chosen to determine the time required for the binding of small molecules to HLM-beads to reach completion. As shown in FIG. 10, binding of these compounds to HLM reached completion within 5 min regardless the compound tested. Thus, compared to established methods such as equilibrium dialysis or ultracentrifugation, which require lengthy permeation or centrifugation steps, significant time-savings can be achieved using HLM-beads. Indeed, conducting a complete incubation using HLM-beads requires as little as 10 minutes as opposed to at least several hours for the above-mentioned methods.

To determine if HLM-beads can be used to assess microsomal binding of small molecules, the $f_{u,mic}$ values of 13 compounds were determined using HLM-bead at three HLM concentrations. These compounds were selected based on their pKa and the extent of ionization at pH 7.4. Among the tested compounds, three are acidic, four are neutral and six are basic at physiological pH. The structure and the pKa values of the compounds are listed in FIG. 7 and Table 11, respectively.

TABLE 11 pKa values of test compounds

|  |  | pKa |
|---|---|---|
| Acidic | Diclofenac | 4.2 |
|  | Tolbutamide | 5.2 |
|  | Warfarin | 5.0 |
| Neutral | Alprazolam | 5.1/18.3 |
|  | Diazepam | 3.4 |
|  | Itraconazole | 3.7 |
|  | Midazolam | 6.6 |
| Basic | Chlorpromazine | 9.3 |
|  | Clozapine | 7.5 |
|  | Diltiazem | 9.4 |
|  | Imipramine | 9.4 |
|  | Verapamil | 9.7 |
|  | BIRT 2584 | 8.2 |

Previous studies have highlighted the relative propensity of basic compounds to bind non-specifically to HLM as opposed to neutral and acidic compounds that generally exhibit less binding possibly due to electrostatic interactions between the protonated base and negatively charged head of the phospholipids.

Figure 11:
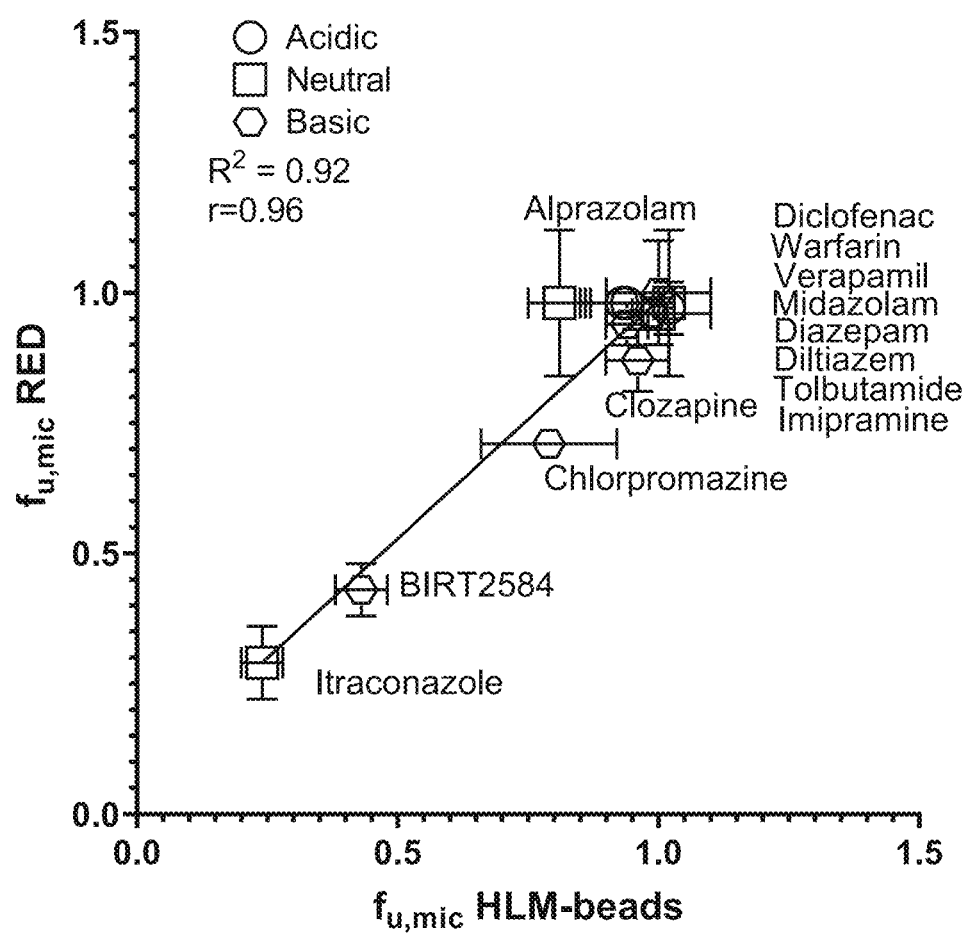
FIG. 11 illustrates the correlation between the fraction of free compound ($f_{u,mic}$) observed HLM-beads vs. rapid equilibrium dialysis (RED) over a set of 13 different compounds with varying levels of microsomal binding. Panel A, B and C represent comparisons between HLM-beads and RED using 0.025 mg/mL, 0.5 and 1 mg/mL HLM, respectively. The data show a close correlation between the $f_{u,mic}$ values obtained using HLM-beads and the RED method, according to an example of the present disclosure.
Figure 11:
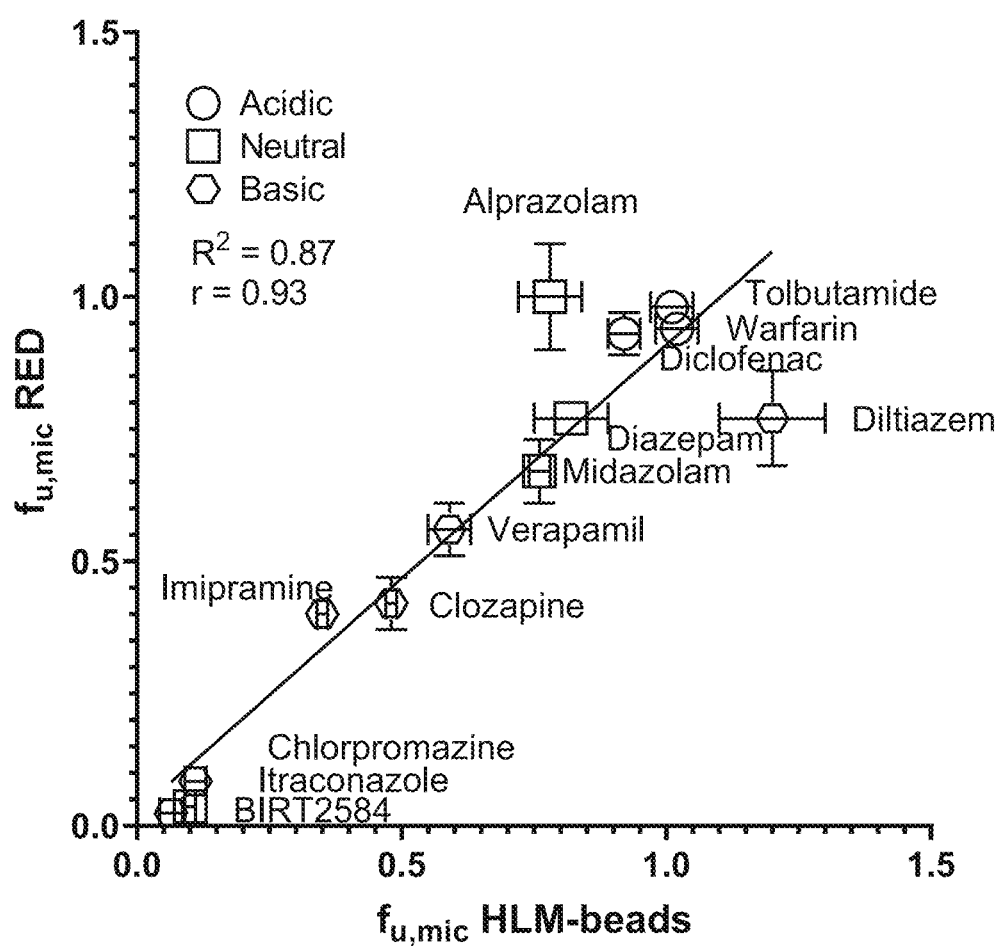
Figure 11:
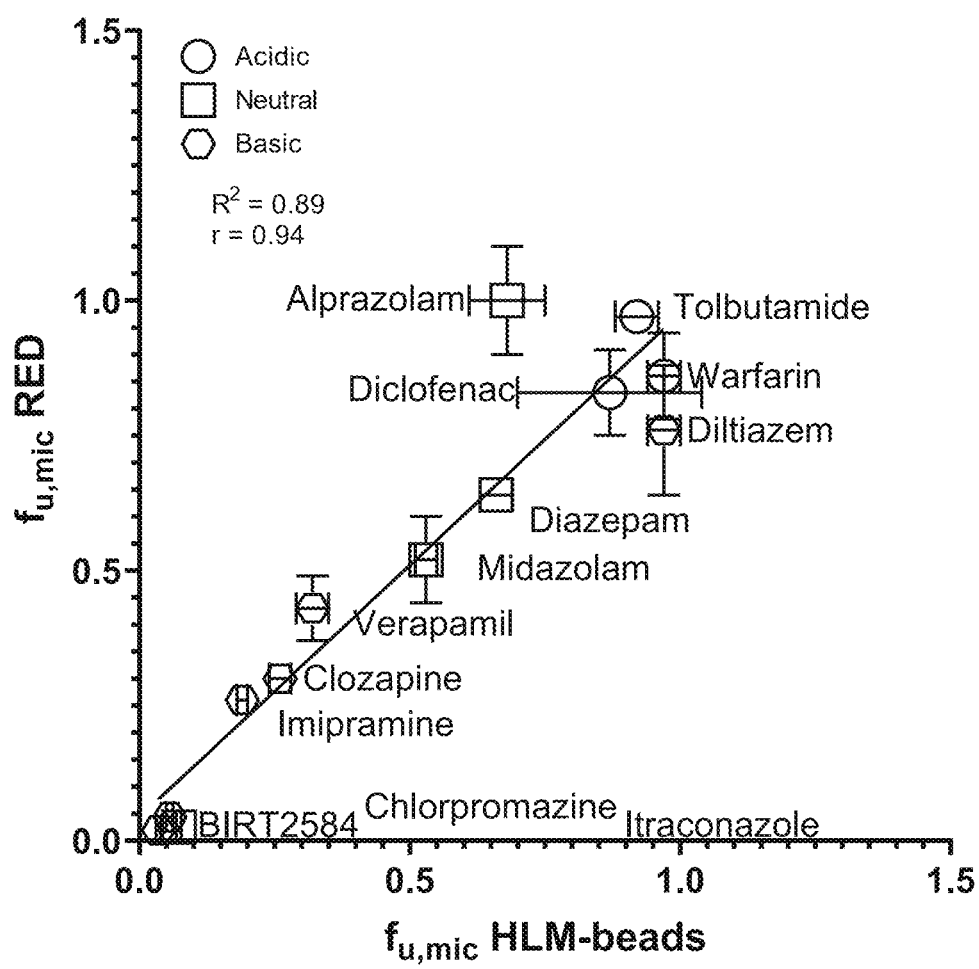

The pattern of binding across acidic, neutral and basic compounds is in good agreement with previous studies demonstrating a propensity of basic compounds to exhibit lower $f_{u,mic}$ values (FIG. 11). The comparison of the $f_{u,mic}$ values obtained by the two methods for all 13 compounds are shown in FIG. 11 and compiled in Tables 1, 2 and 3. The r values shown in FIG. 11 are ≥0.9 indicating a high correlation between $f_{u,mic}$ values obtained using HLM-beads and RED. This suggests that the disparity in the $f_{u,mic}$ value of itraconazole determined using RED vs. HLM-beads is not likely due to high intra-assay variability and more likely due to differences in the assay such as adsorption to the experiment apparatus.

Compound adsorption onto the material of the apparatus is always a concern for obtaining accurate $f_{u,mic}$ value. Three high binders, itraconazole, chlorpromazine and BIRT2584 were selected to test the effect of non-specific adsorption of compound onto the apparatus on $f_{u,mic}$ values determined using the RED. Our studies show that for the HLM-beads, the material adsorption (beads alone) of all test compounds are negligible (data not shown). Furthermore, we previously showed that phospholipids can block HLM from binding to the beads which indicates that it is possible to block binding of material to beads (Example 1). We hypothesized that the HLM would have the same effect of blocking other compounds from attaching onto the beads. Further investigations on the non-specific binding of compounds to the beads is ongoing.

Overall, HLM-beads can be used as a fast and reliable way to determine the HLM fraction unbound for small molecules with accuracy and precision that is comparable to values obtained using equilibrium dialysis. Since the method does not rely on centrifugation or dialysis, the time required to complete an experiment is reduced considerably and can benefit the evaluation of test compounds that are chemically unstable. Furthermore, unlike equilibrium dialysis which must rely on a dialysis membrane, the apparatus used for the HLM-beads can be chosen to avoid any effects of material adsorption on the determination of $f_{u,mic}$ (e.g. silanization of glass tubes).

Nonspecific binding of small molecules to HLM follows a typically $K_d$ (dissociation constant) titration behavior. The $f_{u,mic}$ of test compound is not a fixed value but a value that is compound concentration-, HLM concentration- and $K_d$-dependent. Assuming $f_{u,mic}$ values based on only a few determined $f_{u,mic}$ values over a wide concentration range can be a source of DDI or clearance prediction inaccuracies. Using HLM-beads, it becomes feasible to routinely determine the $f_{u,mic}$ value of each compound concentration used in the assays to make a more accurate prediction. Indeed, as the HLM-beads retain functional enzymes, it is possible to determine $f_{u,mic}$ values in the same incubations used in the in vitro metabolism studies.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

The scope of this disclosure is to be broadly construed. It is intended that this disclosure disclose equivalents, means, systems, and methods to achieve the devices, activities and mechanical actions disclosed herein. For each device, article, method, mean, mechanical element or mechanism disclosed, it is intended that this disclosure also encompasses, in its disclosure and teaches, equivalents, means, systems, and methods for practicing the many aspects, mechanisms, and devices disclosed herein. Additionally, this disclosure regards a coating and its many aspects, features, and elements. Such a device can be dynamic in its use and operation, this disclosure is intended to encompass the equivalents, means, systems, and methods of the use of the device and/or article of manufacture and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

We claim:

1. A method for studying drug metabolism, said method comprising:
    estimating a proportion of non-specific binding of a small molecule drug by determining a free fraction of the drug unbound to human liver microsomes (HLM), comprising the steps of:
    providing a plurality of magnetizable beads in aqueous buffered solution;
    providing a plurality of human liver microsomes;
    providing the drug;
    mixing the plurality of magnetizable beads and plurality of microsomes in the presence of the drug;
    applying a magnetic field to the plurality of microsome-beads to separate the plurality of microsome-beads from the aqueous buffered solution;
    removing a supernatant from the separated microsome beads;
    determining a concentration of drug in the supernatant; and
    using the concentration of the drug in the supernatant to calculate the free fraction of the drug unbound to microsomes which is a ratio of the amount of drug in the supernatant divided by an amount of drug in a control sample without added HLM.

2. The method of claim 1, wherein the magnetizable beads comprise beads having at least one of a silica coating, dextran coating, or polystyrene coating.

3. The method of claim 1, wherein the aqueous buffer comprises a phosphate buffer, tris(hydroxymethyl)aminomethane (TRIS) buffer, bicarbonate buffer, 4-(2-hydroxyethyl)-1-piperazineethanesulfonic acid (HEPES) buffer, or a mixture thereof, having a pH of about 4.0 to about 9.0.

* * * * *